United States Patent
Li et al.

(10) Patent No.: US 12,501,397 B2
(45) Date of Patent: Dec. 16, 2025

(54) TERMINAL POSITIONING METHOD AND DEVICE

(71) Applicant: DATANG MOBILE COMMUNICATIONS EQUIPMENT CO., LTD., Beijing (CN)

(72) Inventors: Hui Li, Beijing (CN); Ren Da, Beijing (CN); Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 440 days.

(21) Appl. No.: 17/928,291

(22) PCT Filed: May 13, 2021

(86) PCT No.: PCT/CN2021/093695
§ 371 (c)(1),
(2) Date: Nov. 29, 2022

(87) PCT Pub. No.: WO2021/238674
PCT Pub. Date: Dec. 2, 2021

(65) Prior Publication Data
US 2023/0309056 A1    Sep. 28, 2023

(30) Foreign Application Priority Data

May 29, 2020   (CN) .......................... 202010478318.6

(51) Int. Cl.
*H04W 64/00* (2009.01)
*H04L 5/00* (2006.01)

(52) U.S. Cl.
CPC ......... *H04W 64/006* (2013.01); *H04L 5/0051* (2013.01)

(58) Field of Classification Search
CPC ... H04W 64/00; H04W 64/006; H04W 4/023; H04L 5/0051; H04L 5/0205; H04L 5/0268; H04L 5/0273; H04L 5/10; G01S 1/08
See application file for complete search history.

(56) References Cited

U.S. PATENT DOCUMENTS 10,620,296 B1    4/2020   Ezal et al.
2006/0148491 A1  7/2006   Hyun et al.
(Continued)

FOREIGN PATENT DOCUMENTS

CN    104540099 A    4/2015
CN    108141698 A    6/2018
(Continued)

*Primary Examiner* — Siu M Lee
(74) *Attorney, Agent, or Firm* — KILPATRICK TOWNSEND & STOCKTON LLP

(57) ABSTRACT

The present application discloses a terminal positioning method and device. In the present application, a positioning server receives positioning measurement information reported by a terminal, acquires downlink-positioning reference signal angle information corresponding to downlink-positioning reference signal resource information reported by a base station, and positions the terminal according to the positioning measurement information reported by the terminal and the downlink-positioning reference signal angle information reported by the base station. The positioning measurement information reported by the terminal includes the downlink-positioning reference signal resource information and a downlink-positioning reference signal measurement corresponding to the downlink-positioning reference signal resource information.

14 Claims, 11 Drawing Sheets

(56) References Cited

U.S. PATENT DOCUMENTS

| | | | |
|---|---|---|---|
| 2006/0240839 A1* | 10/2006 | Chen | G01S 19/48 |
| | | | 455/12.1 |
| 2018/0220392 A1* | 8/2018 | Ly | G01S 5/10 |
| 2018/0310122 A1 | 10/2018 | Xue et al. | |
| 2019/0037529 A1* | 1/2019 | Edge | H04L 5/005 |
| 2019/0158982 A1 | 5/2019 | Farnham | |
| 2019/0166453 A1 | 5/2019 | Edge et al. | |
| 2020/0333427 A1* | 10/2020 | Hu | H04W 24/10 |

FOREIGN PATENT DOCUMENTS

| | | |
|---|---|---|
| CN | 108702726 A | 10/2018 |
| CN | 109085564 A | 12/2018 |
| CN | 110012536 A | 7/2019 |
| CN | 110574327 A | 12/2019 |
| CN | 110998353 A | 4/2020 |
| WO | 2017113054 A1 | 7/2017 |
| WO | 2020028517 A1 | 2/2020 |
| WO | 2020057748 A1 | 3/2020 |
| WO | WO-2021027948 A1 * | 2/2021 |

* cited by examiner

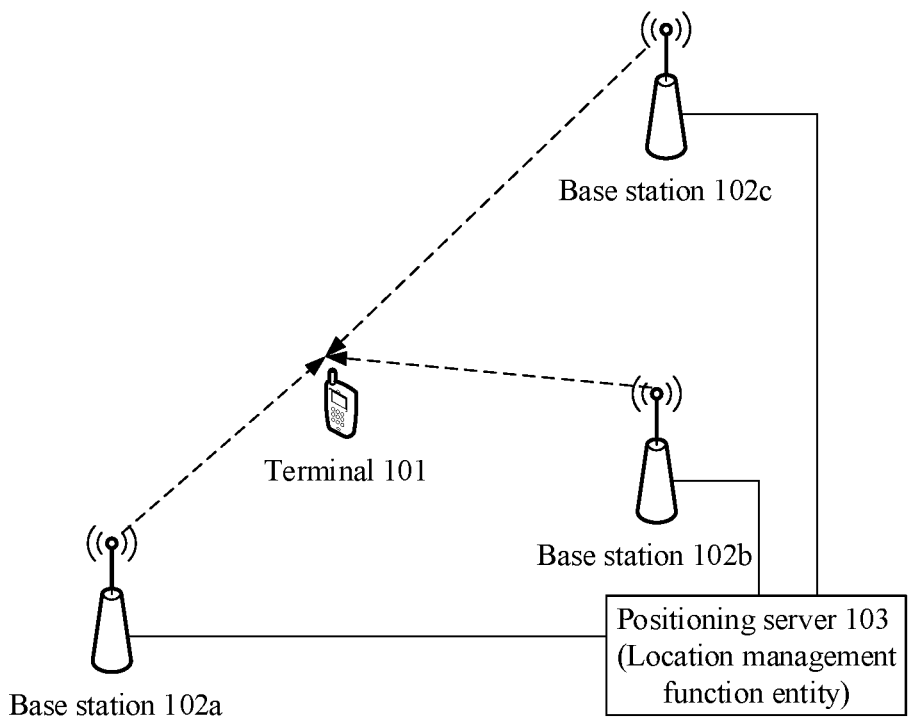

FIG. 1

```
┌─────────────────────────────────────────────────────────────┐  ┌─ S201
│ The positioning server configures the positioning reference │  │
│   signal resource for the base station, and the base        │──┘
│   station sends a positioning reference signal according    │
│   to the configured positioning reference signal resource   │
└─────────────────────────────────────────────────────────────┘
                              ↓
┌─────────────────────────────────────────────────────────────┐  ┌─ S202
│  The terminal measures the positioning reference signal     │  │
│  sent by the base station to obtain the positioning         │──┘
│  measurement information, and reports the positioning       │
│  measurement information to the positioning server          │
└─────────────────────────────────────────────────────────────┘
                              ↓
┌─────────────────────────────────────────────────────────────┐  ┌─ S203
│ The base station reports the positioning reference signal   │  │
│ angle information corresponding to the configured           │──┘
│ positioning reference signal resource to the positioning    │
│ server according to the indication of the positioning server│
└─────────────────────────────────────────────────────────────┘
                              ↓
┌─────────────────────────────────────────────────────────────┐  ┌─ S204
│ The positioning server positions the terminal according to  │  │
│ the positioning measurement information reported by the     │──┘
│ terminal and the PRS angle information reported by the      │
│ base station                                                │
└─────────────────────────────────────────────────────────────┘
```

FIG. 2

TERMINAL POSITIONING METHOD AND DEVICE

CROSS-REFERENCE OF RELATED APPLICATIONS

The present application is a National Stage of International Application No. PCT/CN2021/093695, filed on May 13, 2021, which claims the priority from Chinese Patent Application No. 202010478318.6, filed with the Chinese Patent Office on May 29, 2020 and entitled "Terminal Positioning Method and Device", both of which are hereby incorporated by reference in their entireties.

FIELD OF DISCLOSURE

The present application relates to the field of wireless communication technologies, and in particular, to a terminal positioning method and device.

BACKGROUND

The 3GPP provides a method for terminal positioning based on a New Radio (NR) signal in Rel-16. The positioning method based on the reference signal sent by the wireless cellular communication network includes the following implementation steps.

(1) Positioning parameter measurement: estimating the position-related parameters based on a received signal. These parameters include received signal strength, propagation delay, space Direction of Arrival (DOA), phase and other information.

(2) Location estimation: calculating the terminal location by a location solution algorithm based on the above measurement values.

The NR positioning technologies include downlink positioning technology, uplink positioning technology, and uplink and downlink hybrid positioning technology. Here, in the downlink positioning technology, a UE (User Equipment, terminal) measures a DL PRS (Downlink-Positioning Reference Signal) to obtain a positioning measurement value and reports it to a positioning server, where the downlink positioning technology includes NR DL-TDOA (Downlink-Time Difference Of Arrival) and NR DL-AoD (Downlink-Angle of Departure); in the uplink positioning technology, a gNB (next Generation Node B, 5G base station) measures a UL SRS (Uplink-Sounding Reference Signal) to obtain a positioning measurement value and report it to the positioning server, where the uplink positioning technology includes NR UL-TDOA (Uplink-Time Difference Of Arrival) and NR UL-AoA (Uplink-Angle of Departure); the uplink and downlink hybrid positioning technology includes New Radio Multi Round-Trip Time (NR Multi-RTT).

The positioning accuracy of the above-mentioned terminal positioning technology needs to be improved.

BRIEF SUMMARY

The embodiments of the present application provide a terminal positioning method and device, to improve the positioning accuracy.

In a first aspect, a method for positioning a terminal location is provided, including:
receiving positioning measurement information reported by a terminal, and the positioning measurement information includes downlink positioning reference signal resource information and a downlink positioning reference signal measurement corresponding to the downlink positioning reference signal resource information; obtaining downlink positioning reference signal angle information corresponding to the downlink positioning reference signal resource information reported by a base station; and positioning the terminal according to the positioning measurement information reported by the terminal and the downlink positioning reference signal angle information reported by the base station.

In some implementations, obtaining the downlink positioning reference signal angle information corresponding to the downlink positioning reference signal resource information reported by the base station, includes: sending an instruction to the base station corresponding to the downlink positioning reference signal resource information according to the downlink positioning reference signal resource information in the positioning measurement information reported by the terminal, and the instruction carries the downlink positioning reference signal resource information; and receiving the downlink positioning reference signal angle information corresponding to the downlink positioning reference signal resource information carried in the instruction reported by the base station.

In some implementations, the method further includes: instructing the base station to determine corresponding downlink positioning reference signal angle information for all configured downlink positioning reference signal resources; and receiving downlink positioning reference signal angle information corresponding to all the downlink positioning reference signal resources reported by the base station.

In some implementations, the downlink positioning reference signal resource information includes an index of a downlink positioning reference signal resource, or the downlink positioning reference signal resource information includes an index of a downlink positioning reference signal resource set.

In some implementations, the downlink positioning reference signal angle information includes: a horizontal dimension angle and/or a vertical dimension angle of a downlink positioning reference signal.

In a second aspect, a terminal positioning method is provided, including: configuring a downlink positioning reference signal resource and determining corresponding downlink positioning reference signal angle information, and sending a downlink positioning reference signal according to the downlink positioning reference signal resource and the corresponding downlink positioning reference signal angle information; and reporting the downlink positioning reference signal angle information corresponding to the configured downlink positioning reference signal resource to a positioning server according to an indication of the positioning server, and the positioning server positions a terminal according to positioning measurement information reported by the terminal and the downlink positioning reference signal angle information reported by the base station, and the positioning measurement information includes downlink positioning reference signal resource information and a downlink positioning reference signal measurement corresponding to the downlink positioning reference signal resource information.

In some implementations, reporting the downlink positioning reference signal angle information corresponding to the configured downlink positioning reference signal resource to the positioning server according to the indication of the positioning server, includes: receiving an instruction sent by the positioning server, and the instruction carries the downlink positioning reference signal resource information in the positioning measurement information reported by the terminal; and sending the downlink positioning reference signal angle information corresponding to the downlink positioning reference signal resource information carried in the instruction to the positioning server.

In some implementations, reporting the downlink positioning reference signal angle information corresponding to the configured downlink positioning reference signal resource to the positioning server according to the indication of the positioning server, includes: receiving an instruction sent by the positioning server; and reporting downlink positioning reference signal angle information corresponding to all downlink positioning reference signal resources configured by the base station to the positioning server according to the instruction.

In some implementations, the downlink positioning reference signal resource information includes an index of a downlink positioning reference signal resource, or the downlink positioning reference signal resource information includes an index of a downlink positioning reference signal resource set.

In some implementations, the downlink positioning reference signal angle information includes: a horizontal dimension angle and/or a vertical dimension angle of a downlink positioning reference signal.

In a third aspect, a positioning server is provided, including:
  a receiving device, configured to receive positioning measurement information reported by a terminal, and the positioning measurement information includes downlink positioning reference signal resource information and a downlink positioning reference signal measurement corresponding to the downlink positioning reference signal resource information;
  an obtaining device, configured to obtain downlink positioning reference signal angle information corresponding to the downlink positioning reference signal resource information reported by a base station;
  a positioning device, configured to position the terminal according to the positioning measurement information reported by the terminal and the downlink positioning reference signal angle information reported by the base station.

In some embodiments, the obtaining device is specifically configured to:
  send an instruction to the base station corresponding to the downlink positioning reference signal resource information according to the downlink positioning reference signal resource information in the positioning measurement information reported by the terminal, and the instruction carries the downlink positioning reference signal resource information;
  receive the downlink positioning reference signal angle information corresponding to the downlink positioning reference signal resource information carried in the instruction reported by the base station.

In some embodiments, the positioning server further includes:
  an instruction device, configured to instruct the base station to determine corresponding downlink positioning reference signal angle information for all configured downlink positioning reference signal resources;
  the receiving device is further configured to: receive downlink positioning reference signal angle information corresponding to all the downlink positioning reference signal resources reported by the base station.

In some embodiments, the downlink positioning reference signal resource information includes an index of a downlink positioning reference signal resource, or the downlink positioning reference signal resource information includes an index of a downlink positioning reference signal resource set.

In some embodiments, the downlink positioning reference signal angle information includes: a horizontal dimension angle and/or a vertical dimension angle of a downlink positioning reference signal.

In a fourth aspect, a base station is provided, including:
  a sending device, configured to configure a downlink positioning reference signal resource and determine corresponding downlink positioning reference signal angle information, and send a downlink positioning reference signal according to the downlink positioning reference signal resource and the corresponding downlink positioning reference signal angle information;
  a measurement reporting device, configured to report the downlink positioning reference signal angle information corresponding to the configured downlink positioning reference signal resource to a positioning server according to an indication of the positioning server, and the positioning server positions a terminal according to positioning measurement information reported by the terminal and the downlink positioning reference signal angle information reported by the base station, and the positioning measurement information includes downlink positioning reference signal resource information and a downlink positioning reference signal measurement corresponding to the downlink positioning reference signal resource information.

In some embodiments, the base station further includes:
  a receiving device, configured to receive an instruction sent by the positioning server, and the instruction carries the downlink positioning reference signal resource information in the positioning measurement information reported by the terminal;
  the measurement reporting device is further configured to: send the downlink positioning reference signal angle information corresponding to the downlink positioning reference signal resource information carried in the instruction to the positioning server.

In some embodiments, the measurement reporting device is specifically configured to:
  receive an instruction sent by the positioning server;
  report downlink positioning reference signal angle information corresponding to all downlink positioning reference signal resources configured by the base station to the positioning server according to the instruction.

In some embodiments, the downlink positioning reference signal resource information includes an index of a downlink positioning reference signal resource, or the downlink positioning reference signal resource information includes an index of a downlink positioning reference signal resource set.

In some embodiments, the downlink positioning reference signal angle information includes: a horizontal dimension angle and/or a vertical dimension angle of a downlink positioning reference signal.

In a fifth aspect, a positioning server is provided, including: a processor, a memory and a communication interface; and the communication interface receives and sends data under control of the processor; the memory stores computer instructions; and the processor is configured to read the computer instructions to perform the method described in any implementation of the first aspect described above.

In a sixth aspect, a base station is provided, including: a processor, a memory and a transceiver; and the transceiver receives and sends data under control of the processor; the memory stores computer instructions; and the processor is configured to read the computer instructions to perform the method described in any implementation of the second aspect described above.

In a seventh aspect, a computer readable storage medium is provided, where the computer readable storage medium stores computer executable instructions which are configured to cause a computer to perform the method described in any implementation of the first aspect described above.

In an eighth aspect, a computer readable storage medium is provided, where the computer readable storage medium stores computer executable instructions which are configured to cause a computer to perform the method described in any implementation of the second aspect described above.

In the above embodiments of the present application, during downlink positioning, on the one hand, the terminal reports the positioning measurement information, and on the other hand, the base station reports the downlink positioning reference signal angle information, and the positioning server positions the terminal according to the positioning measurement information reported by the terminal and the downlink positioning reference signal angle information reported by the base station, to improve the positioning accuracy.

In a ninth aspect, a terminal positioning method is provided, including: sending a measurement reporting configuration instruction to a base station, and the measurement reporting configuration instruction is used to instruct the base station to report an uplink reference signal angle measurement obtained by measuring an uplink reference signal sent by a terminal and corresponding additional path angle information; receiving the uplink reference signal angle measurement and a corresponding additional path angle measurement reported by the base station; and positioning the terminal according to the uplink reference signal angle measurement and the corresponding additional path angle information reported by the base station.

In some embodiments, the additional path angle information includes: a horizontal dimension angle and/or a vertical dimension angle of each of additional paths of an uplink reference signal corresponding to the uplink reference signal angle measurement.

In a tenth aspect, a terminal positioning method is provided, including: receiving a measurement reporting configuration instruction sent by a positioning server; measuring an uplink reference signal sent by a terminal to obtain an uplink reference signal angle measurement and corresponding additional path angle information; and reporting the uplink reference signal measurement and the corresponding additional path angle information to the positioning server according to the measurement reporting configuration instruction, and the positioning server positions the terminal according to the uplink reference signal measurement and the corresponding additional path angle information reported by the base station.

In some embodiments, the additional path angle information includes: a horizontal dimension angle and/or a vertical dimension angle of each of additional paths of an uplink reference signal corresponding to the uplink reference signal angle measurement.

In an eleventh aspect, a positioning server is provided, including:

a sending device, configured to send a measurement reporting configuration instruction to a base station, and the measurement reporting configuration instruction is used to instruct the base station to report an uplink reference signal angle measurement obtained by measuring an uplink reference signal sent by a terminal and corresponding additional path angle information;

a receiving device, configured to receive the uplink reference signal angle measurement and a corresponding additional path angle measurement reported by the base station;

a positioning device, configured to position the terminal according to the uplink reference signal angle measurement and the corresponding additional path angle information reported by the base station.

In some embodiments, the additional path angle information includes: a horizontal dimension angle and/or a vertical dimension angle of each of additional paths of an uplink reference signal corresponding to the uplink reference signal angle measurement.

In a twelfth aspect, a base station is provided, including:

a receiving device, configured to receive a measurement reporting configuration instruction sent by a positioning server;

a measurement device, configured to measure an uplink reference signal sent by a terminal to obtain an uplink reference signal angle measurement and corresponding additional path angle information;

a reporting device, configured to report the uplink reference signal measurement and the corresponding additional path angle information to the positioning server according to the measurement reporting configuration instruction, and the positioning server positions the terminal according to the uplink reference signal measurement and the corresponding additional path angle information reported by the base station.

In some embodiments, the additional path angle information includes: a horizontal dimension angle and/or a vertical dimension angle of each of additional paths of an uplink reference signal corresponding to the uplink reference signal angle measurement.

In a thirteenth aspect, a positioning server is provided, including: a processor, a memory and a communication interface; and the communication interface receives and sends data under control of the processor; the memory stores computer instructions; and the processor is configured to read the computer instructions to perform the method described in any implementation of the ninth aspect described above.

In a fourteenth aspect, a base station is provided, including: a processor, a memory and a transceiver; and the transceiver receives and sends data under control of the processor; the memory stores computer instructions; and the processor is configured to read the computer instructions to perform the method described in any implementation of the tenth aspect described above.

In a fifteenth aspect, a computer readable storage medium is provided, where the computer readable storage medium stores computer executable instructions which are configured to cause a computer to perform the method described in any implementation of the ninth aspect described above.

In a sixteenth aspect, a computer readable storage medium is provided, where the computer readable storage medium stores computer executable instructions which are configured to cause a computer to perform the method described in any implementation of the tenth aspect described above.

In the above embodiments of the present application, during uplink positioning, the base station reports the uplink reference signal angle measurement and the corresponding additional path angle information, and the positioning server positions the terminal according to the uplink reference signal angle measurement and the corresponding additional path angle information reported by the base station, to improve the positioning accuracy.

In a seventeenth aspect, a terminal positioning method is provided, including: sending a measurement reporting configuration instruction to a terminal, and the measurement reporting configuration instruction is used to instruct the terminal to report at least two types of positioning measurements; receiving the at least two types of positioning measurements reported by the terminal; and positioning the terminal according to the at least two types of positioning measurements reported by the terminal, and the at least two types of positioning measurements include at least two of a time measurement, an angle measurement and a power measurement; and among the at least two types of positioning measurements, one type of positioning measurement is associated with at least one positioning measurement in another type of positioning measurements, or one type of positioning measurement is associated with at least two other types of positioning measurements.

In some implementations, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some implementations, the numbers of measurements of different paths among the additional paths are same or different.

In some implementations, a reporting manner of the measurements of the additional paths is configured by the positioning server, or predefined by a system, or determined by the terminal.

In some implementations, the at least two types of positioning measurements include at least a time measurement and an angle measurement, or at least a downlink angle measurement and a power measurement.

In an eighteenth aspect, a method for positioning a terminal location is provided, including: receiving a measurement reporting configuration instruction sent by a positioning server, and the measurement reporting configuration instruction is used to instruct a terminal to report at least two types of positioning measurements, which include at least two of a time measurement, an angle measurement and a power measurement; determining at least two types of positioning measurements reported, and among the at least two types of positioning measurements, one type of positioning measurement is associated with at least one positioning measurement of another type, or one type of positioning measurement is associated with at least two other types of positioning measurements; and reporting at least two types of positioning measurements to the positioning server.

In some implementations, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some implementations, the numbers of measurements of different paths among the additional paths are same or different.

In some implementations, a reporting manner of the measurements of the additional paths is configured by the positioning server, or predefined by a system, or determined by the terminal.

In some implementations, the at least two types of positioning measurements include at least a time measurement and an angle measurement, or at least a downlink angle measurement and a power measurement.

In a nineteenth aspect, a positioning server is provided, including:
a sending device, configured to send a measurement reporting configuration instruction to a terminal, and the measurement reporting configuration instruction is used to instruct the terminal to report at least two types of positioning measurements;
a receiving device, configured to receive the at least two types of positioning measurements reported by the terminal;
a positioning device, configured to position the terminal according to the at least two types of positioning measurements reported by the terminal, and the at least two types of positioning measurements include at least two of a time measurement, an angle measurement and a power measurement; and among the at least two types of positioning measurements, one type of positioning measurement is associated with at least one positioning measurement in another type of positioning measurements, or one type of positioning measurement is associated with at least two other types of positioning measurements.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the terminal.

In some embodiments, the at least two types of positioning measurements include at least a time measurement and an angle measurement, or at least a downlink angle measurement and a power measurement.

In a twentieth aspect, a terminal is provided, including:
a receiving device, configured to receive a measurement reporting configuration instruction sent by a positioning server, and the measurement reporting configuration instruction is used to instruct the terminal to report at least two types of positioning measurements, which include at least two of a time measurement, an angle measurement and a power measurement;
a measurement device, configured to determine at least two types of positioning measurements reported, and among the at least two types of positioning measurements, one type of positioning measurement is associated with at least one positioning measurement of another type, or one type of positioning measurement is associated with at least two other types of positioning measurements;

a reporting device, configured to report at least two types of positioning measurements to the positioning server.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the terminal.

In some embodiments, the at least two types of positioning measurements include at least a time measurement and an angle measurement, or at least a downlink angle measurement and a power measurement.

In a twenty-first aspect, a positioning server is provided, including: a processor, a memory and a communication interface; and the communication interface receives and sends data under control of the processor; the memory stores computer instructions; and the processor is configured to read the computer instructions to perform the method described in any implementation of the seventeenth aspect described above.

In a twenty-second aspect, a terminal is provided, including: a processor, a memory and a transceiver; and the transceiver receives and sends data under control of the processor; the memory stores computer instructions; and the processor is configured to read the computer instructions to perform the method described in any implementation of the eighteenth aspect described above.

In a twenty-third aspect, a computer readable storage medium is provided, where the computer readable storage medium stores computer executable instructions which are configured to cause a computer to perform the method described in any implementation of the seventeenth aspect described above.

In a twenty-fourth aspect, a computer readable storage medium is provided, where the computer readable storage medium stores computer executable instructions which are configured to cause a computer to perform the method described in any implementation of the eighteenth aspect described above.

In the above embodiments of the present application, during downlink positioning, the terminal reports at least two types of positioning measurements, and the positioning server can position the terminal according to more types of positioning measurements, to improve the positioning accuracy.

In a twenty-fifth aspect, a method for positioning a terminal location is provided, including: sending a measurement reporting configuration instruction to a base station, and the measurement reporting configuration instruction is used to instruct the base station to report at least two types of positioning measurements, which include at least two of a time measurement, an angle measurement and a power measurement; receiving at least two types of positioning measurements reported by the base station and obtained by measuring an uplink signal sent by a terminal, and among the at least two types of positioning measurements, one type of positioning measurement is associated with at least one positioning measurement of another type, or one type of positioning measurement is associated with at least two other types of positioning measurements; and positioning the terminal according to the at least two types of positioning measurements reported by the base station.

In some implementations, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some implementations, the numbers of measurements of different paths among the additional paths are same or different.

In some implementations, a reporting manner of the measurements of the additional paths is configured by the positioning server, or predefined by a system, or determined by the base station.

In some implementations, the at least two types of positioning measurements include at least a time measurement and an angle measurement, or at least a downlink angle measurement and a power measurement.

In a twenty-sixth aspect, a method for positioning a terminal location is provided, including: receiving a measurement reporting configuration instruction sent by a positioning server, and the measurement reporting configuration instruction is used to instruct a base station to report at least two types of positioning measurements, which include at least two of a time measurement, an angle measurement and a power measurement; determining at least two types of positioning measurements reported and obtained by measuring an uplink reference signal sent by a terminal, and among the at least two types of positioning measurements, one type of positioning measurement is associated with at least one positioning measurement of another type, or one type of positioning measurement is associated with at least two other types of positioning measurements; and reporting at least two types of positioning measurements to the positioning server.

In some implementations, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some implementations, the numbers of measurements of different paths among the additional paths are same or different.

In some implementations, a reporting manner of the measurements of the additional paths is configured by the positioning server, or predefined by a system, or determined by the base station.

In some implementations, the at least two types of positioning measurements include at least a time measurement and an angle measurement, or at least a downlink angle measurement and a power measurement.

In a twenty-seventh aspect, a positioning server is provided, including:

a sending device, configured to send a measurement reporting configuration instruction to a base station, and the measurement reporting configuration instruction is used to instruct the base station to report at least two types of positioning measurements, which include at least two of a time measurement, an angle measurement and a power measurement;

a receiving device, configured to receive at least two types of positioning measurements reported by the base station and obtained by measuring an uplink signal sent by a terminal, and among the at least two types of positioning measurements, one type of positioning measurement is associated with at least one positioning measurement of another type, or one type of positioning measurement is associated with at least two other types of positioning measurements;

a positioning device, configured to position the terminal according to the at least two types of positioning measurements reported by the base station.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the base station.

In some embodiments, the at least two types of positioning measurements include at least a time measurement and an angle measurement, or at least a downlink angle measurement and a power measurement.

In a twenty-eighth aspect, a base station is provided, including:

a receiving device, configured to receive a measurement reporting configuration instruction sent by a positioning server, and the measurement reporting configuration instruction is used to instruct the base station to report at least two types of positioning measurements, which include at least two of a time measurement, an angle measurement and a power measurement;

a measurement device, configured to determine at least two types of positioning measurements reported and obtained by measuring an uplink signal sent by a terminal, and among the at least two types of positioning measurements, one type of positioning measurement is associated with at least one positioning measurement of another type, or one type of positioning measurement is associated with at least two other types of positioning measurements;

a reporting device, configured to report at least two types of positioning measurements to the positioning server.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the base station.

In some embodiments, the at least two types of positioning measurements include at least a time measurement and an angle measurement, or at least a downlink angle measurement and a power measurement.

In a twenty-ninth aspect, a positioning server is provided, including: a processor, a memory and a communication interface; and the communication interface receives and sends data under control of the processor; the memory stores computer instructions; and the processor is configured to read the computer instructions to perform the method described in any implementation of the twenty-fifth aspect described above.

In a thirtieth aspect, a base station is provided, including: a processor, a memory and a transceiver; and the transceiver receives and sends data under control of the processor; the memory stores computer instructions; and the processor is configured to read the computer instructions to perform the method described in any implementation of the twenty-sixth aspect described above.

In a thirty-first aspect, a computer readable storage medium is provided, where the computer readable storage medium stores computer executable instructions which are configured to cause a computer to perform the method described in any implementation of the twenty-fifth aspect described above.

In a thirty-second aspect, a computer readable storage medium is provided, where the computer readable storage medium stores computer executable instructions which are configured to cause a computer to perform the method described in any implementation of the twenty-sixth aspect described above.

In the above embodiments of the present application, during uplink positioning, the base station reports at least two types of positioning measurements, and the positioning server can position the terminal according to more types of positioning measurements, to improve the positioning accuracy.

BRIEF DESCRIPTION OF THE DRAWINGS

In order to illustrate the embodiments of the present application more clearly, the accompanying figures which need to be used in the embodiments of the present application will be introduced below briefly. The accompanying figures introduced below are only some embodiments of the present application, and other accompanying figures can also be obtained according to these accompanying figures.

FIG. 1 is a positioning system architecture of a 5G NR system in an embodiment of the present application;

FIG. 2 and FIG. 3 are schematic diagrams of a downlink positioning process according to an embodiment of the present application;

DETAILED DESCRIPTION OF THE EMBODIMENTS

Figure 3:
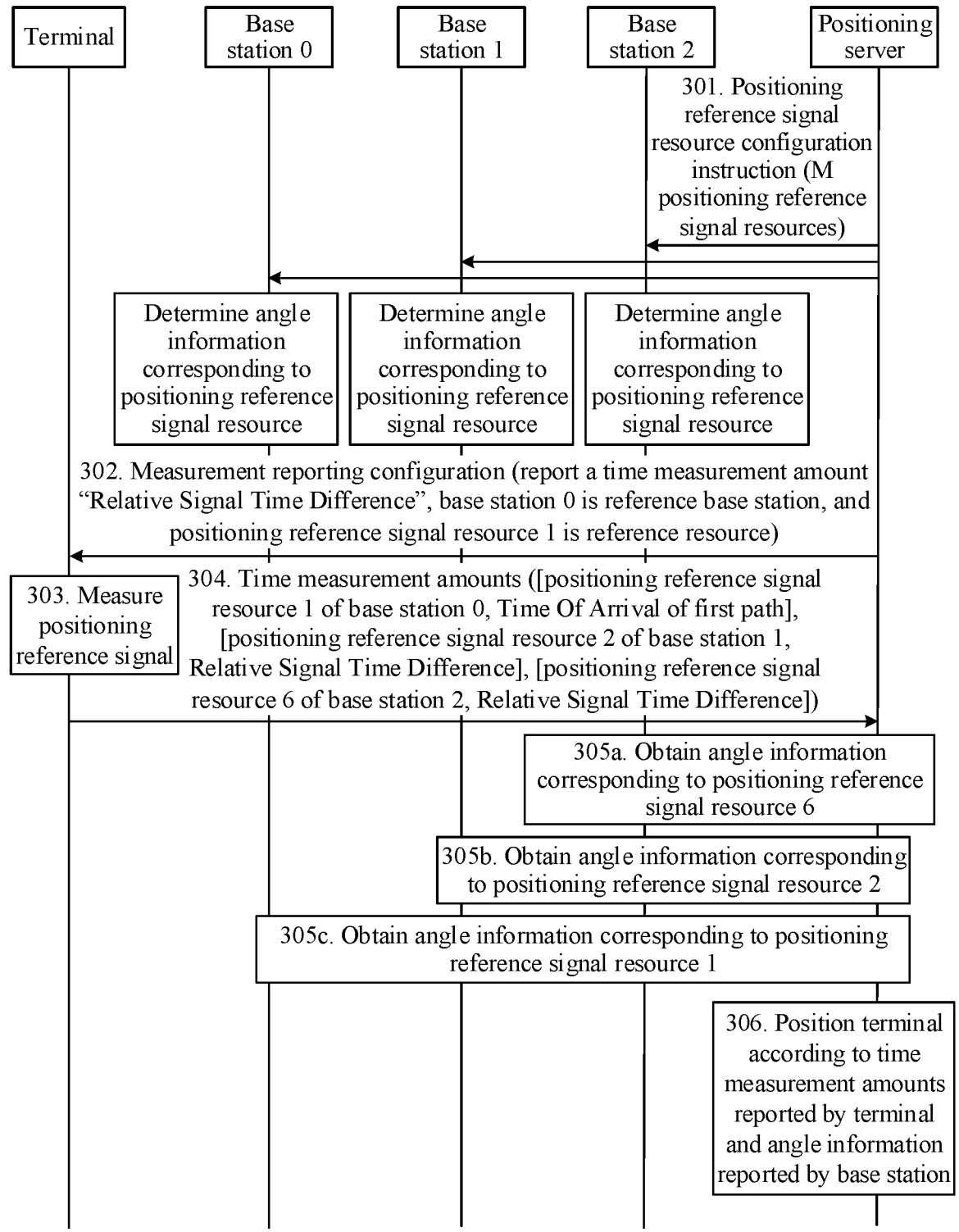

In order to make the embodiments of the present application clearer, the present application will be further illustrated below in details with reference to the accompanying figures. The described embodiments are merely a part of the embodiments of the present application but not all the embodiments. Based upon the embodiments of the present application, all of other embodiments obtained pertain to the protection scope of the present application.

In the following, some terms in the embodiments of the present application are explained.

(1) In the embodiments of the present application, the nouns "network" and "system" are often used alternately, and the meaning is understand thereof.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "I" generally indicates that the associated objects have a kind of "or" relationship.

(4) Network device is a device that provides the wireless communication function for the terminal, including but not limited to: gNB in 5G, Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc. The base station in the present application may also be a device that provides the wireless communication function for the terminal in other communication systems that may appear in the future. The embodiments of the present application are described by taking a base station as an example.

(5) Terminal is a device that can provide users with voice and/or data connectivity. For example, the terminal device includes a handheld device with wireless connection function, a vehicle-mounted device, etc. At present, the terminal device may be: mobile phone, tablet, laptop, palmtop computer, Mobile Internet Device (MID), wearable device, Virtual Reality (VR) device, Augmented Reality (AR) device, wireless terminal in the industrial control, wireless terminal in the self-driving, wireless terminal in the smart grid, wireless terminal in the transportation safety, wireless terminal in the smart city, or wireless terminal in the smart home, etc.

(6) Reference signal for downlink positioning, which is referred to as downlink positioning reference signal in the embodiments of the present application, such as Positioning Reference Signal (PRS). The positioning server may configure the PRS resource for the base station, and the base station sends a PRS according to the PRS resource. The positioning server may configure one or more PRS resources for the base station.

(7) Reference signal for uplink positioning, which is referred to as uplink reference signal in the embodiments of the present application, such as Sounding Reference Signal (SRS). The positioning server may configure the SRS resource for the terminal, and the terminal sends an SRS according to the SRS resource. The positioning server may configure one or more SRS resources for the terminal.

Corresponding positioning measurement values are defined for each positioning technology in the NR, specifically as follows:

NR DL-TDOA: UE reports DL RSTD (Downlink-Relative Signal Time Difference), and may reports DL PRS RSRP (Reference Signal Received Power);

NR DL-AoD: UE reports DL PRS RSRP;

NR UL-TDOA: gNB reports RTOA (Relative Time Of Arrival), and may reports DL PRS RSRP;

NR UL-AoA: gNB reports A-AoA (Angle of Arrival) and Z-AoA (Zenith Angle of Arrival), and may reports UL SRS-RSRP;

NR Multi-RTT: UE reports UE Rx-Tx time difference, and optionally reports DL PRS RSRP; gNB reports gNB Rx-Tx time difference, and may reports UL SRS-RSRP, and may reports A-AoA and Z-AoA.

In the above-mentioned terminal positioning technology, the measurement on which the positioning server relies when positioning the terminal location is single, resulting in the low positioning accuracy.

An embodiment of the present application provides a terminal positioning method, which can improve the positioning accuracy. The embodiments of the present application may be applied to the 5G NR system or an evolution system thereof.

The embodiments of the present application will be described below in detail with reference to the drawings.

FIG. 1 exemplarily shows the positioning related entities in the 5G NR system. As shown in the figure, for 5G NR positioning, the involved entities include a terminal 101, base stations (102a, 102b, 102c as shown in the figure) and a positioning server 103, and the positioning server is also called Location Management Function (LMF).

Based on the above system architecture, in the conventional positioning technology, for downlink positioning, the terminal 101 measures the PRSs sent by the base stations (102a, 102b, 102c) respectively to obtain the positioning measurements and reports them to the positioning server 103, and the positioning server 103 calculates the location of the terminal 101 by using a location calculation algorithm based on the positioning measurements reported by the terminal 101. For uplink positioning, the base stations (102a, 102b, 102c) respectively measure the SRS sent by the terminal 101 to obtain the positioning measurements and report them to the positioning server 103, and the positioning server 103 calculates the location of the terminal 101 by using the location calculation algorithm based on the positioning measurements reported by the base stations (102a, 102b, 102c).

For downlink positioning, the positioning server (LMF) configures the PRS resource for the base station and the base station sends the PRS in some embodiments of the present application. The terminal measures the PRS to obtain a positioning measurement and reports it to the positioning server (LMF); the base station can also report the PRS angle information corresponding to the PRS resource index reported by the terminal to the positioning server (LMF); and the positioning server (LMF) positions the terminal according to the positioning measurement reported by the terminal and the PRS angle information reported by the base station. The specific implementation process can refer to the flows shown in FIG. 2 and FIG. 3.

For uplink positioning, the positioning server (LMF) configures the SRS resource for the terminal and the terminal sends the SRS in some embodiments of the present application. The base station measures the SRS to obtain an SRS angle measurement and the corresponding additional path angle information and reports them to the positioning server (LMF), and the positioning server (LMF) positions the terminal according to the SRS angle measurement and the corresponding additional path angle information reported by the base station. The specific implementation process can refer to the flows shown in FIG. 4 and FIG. 5.

For downlink positioning, the positioning server (LMF) configures the PRS resource for the base station and the base station sends the PRS in some embodiments of the present application. The terminal measures the PRS to obtain at least two types of positioning measurements and reports them to the positioning server (LMF), and the positioning server (LMF) positions the terminal according to the at least two types of positioning measurements reported by the terminal, and the at least two types of positioning measurements may include at least two of a time measurement, an angle measurement and a power measurement. The specific implementation process can refer to the flows shown in FIG. 6, FIG. 7 and FIG. 8.

For uplink positioning, the positioning server (LMF) configures the SRS resource for the terminal and the terminal sends the SRS in some embodiments of the present application. The base station measures the SRS to obtain at least two types of positioning measurements and reports them to the positioning server (LMF), and the positioning server (LMF) positions the terminal according to the at least two types of positioning measurements reported by the base station, and the at least two types of positioning measurements may include at least two of a time measurement, an angle measurement and a power measurement. The specific implementation process can refer to the flows shown in FIG. 9 and FIG. 10.

For uplink and downlink hybrid positioning, the uplink positioning method and the downlink positioning method provided in the above embodiments may be combined to implement in some embodiments of the present application.

In some other embodiments of the present application, the above-mentioned different downlink positioning methods may also be used in combination. For example, the positioning server (LMF) configures the PRS resource for the base station, and the base station sends the PRS. The terminal measures the PRS to obtain at least two types of positioning measurements and reports them to the positioning server (LMF); the base station can also report the PRS angle information corresponding to the PRS resource index reported by the terminal to the positioning server (LMF); and the positioning server (LMF) positions the terminal according to the at least two types of positioning measurements reported by the terminal and the PRS angle information reported by the base station.

In some other embodiments of the present application, the above-mentioned different uplink positioning methods may also be used in combination. For example, the positioning server (LMF) configures the SRS resource for the terminal, and the terminal sends the SRS. The base station measures the SRS to obtain at least two types of SRS measurements and the corresponding additional path angle information and reports them to the positioning server (LMF), and the positioning server (LMF) positions the terminal according to the at least two types of SRS measurements and the corresponding additional path angle information reported by the base station.

It should be noted that the terminal in embodiments of the present application is a terminal that needs to be positioned by the positioning server.

Referring to FIG. 2, it is a schematic diagram of a downlink positioning process according to an embodiment of the present application. This process describes a process in which the terminal measures a downlink positioning reference signal (hereinafter referred to as PRS) and reports a positioning measurement, and the base station reports the PRS angle information corresponding to the PRS resource, and the positioning server positions the terminal according to the PRS measurement reported by the terminal and the PRS angle information reported by the base station.

As shown, the process may include:

S201: The positioning server configures the PRS resource for the base station, and the base station sends a PRS according to the configured PRS resource.

In this step, the positioning server may configure one or more PRS resources for the base station. Each PRS resource may correspond to one direction, and different PRS resources correspond to different directions. The direction corresponding to the PRS resource may be described by the angle information, which may include at least one of a horizontal dimension angle and a vertical dimension angle.

In some embodiments, the PRS angle information corresponding to one PRS resource is determined by the base station, and the base station may send the PRS according to the PRS resource and the direction indicated by the corresponding PRS angle information.

S202: The terminal measures the PRS sent by the base station to obtain the positioning measurement information, and reports the positioning measurement information to the positioning server.

Here, the positioning measurement information includes PRS resource information and a PRS measurement corresponding to the PRS resource information, and the PRS resource information includes a PRS resource index, or an index of a PRS resource set. The positioning measurements may include positioning measurements obtained by measuring the PRSs of three base stations. In some embodiments, the terminal can measure the PRS sent by each base station, and select the PRS measurement corresponding to the optimal PRS resource for each base station to report, or select the PRS measurements corresponding to some or all of the PRS resources to report. The reported positioning measurements may include an index of the optimal PRS resource (or an index of a PRS resource set) of each base station and the corresponding PRS measurement.

The terminal may report the corresponding type of PRS measurement according to the type of the measurement configured by the positioning server. In some embodiments, according to the configuration of the positioning server, the terminal can report at least one of three types of measurements: time measurement (e.g., TDOA), angle measurement (e.g., AoD), and power measurement (e.g., RSRP).

S203: The base station reports the PRS angle information corresponding to the configured PRS resource to the positioning server according to the indication of the positioning server.

In some embodiments, the base station may report the PRS angle information corresponding to all the PRS resources configured by the base station according to the indication of the positioning server. In some embodiments, the positioning server may instruct the base station to determine the corresponding PRS angle information for all the configured PRS resources, and instruct the base station to report the PRS angle information corresponding to all the PRS resources. After receiving the positioning measurement information reported by the terminal, the positioning server may, according to the PRS resource information (such as the PRS resource index) included in the positioning measurement information reported by the terminal, select the PRS angle information corresponding to the PRS resource information from the angle information corresponding to all the PRS resource information reported by the corresponding base station, to position the terminal.

In other embodiments, the base station may report the PRS angle information corresponding to some PRS resources configured by the base station according to the indication of the positioning server, where the some PRS resources are determined by the PRS resource information included in the positioning measurement information reported by the terminal. In some embodiments, the positioning server may send an instruction to the base station corresponding to the PRS resource information according to the PRS resource information reported by the terminal, and the instruction carries the PRS resource information corresponding to the base station in the positioning measurement information reported by the terminal, and the base station reports the PRS angle information corresponding to the PRS resource information carried in the instruction.

S204: The positioning server positions the terminal according to the positioning measurement information reported by the terminal and the PRS angle information reported by the base station.

In this step, the positioning server may associate the positioning measurement reported by the terminal with the PRS angle information reported by the relevant base station, and to position the terminal.

It should be noted that the execution sequence of all the steps in the process shown in FIG. 2 is only an example. In some scenarios, after the positioning server configures the PRS resource for the base station, the base station can send the PRS according to the configuration of the positioning server within a period of time, until the positioning server configures the new PRS resource or instructs the base station to stop sending the PRS. During this period, one terminal may be positioned multiple times, or the terminals may be positioned.

As can be seen from the above description, in the above embodiments of the present application, the base station also reports the PRS angle information while the terminal reports the positioning measurement, and the positioning server can not only rely on the positioning measurement reported by the terminal but also rely on the PRS angle information reported by the base station when positioning the terminal. Compared with the traditional terminal positioning method, the basis for positioning the terminal is increased in the embodiment of the present application, so the positioning accuracy can be improved.

Based on the downlink positioning process shown in FIG. 2, FIG. 3 exemplarily shows the DL-TDOA positioning process by taking the DL-TDOA positioning technology as an example. As shown in FIG. 3, the process may include followings.

301: The LMF configures M=8 PRS resources for each gNB base station (gNB base station 0, gNB base station 1 and gNB base station 2 in the figure).

Each PRS resource is formed differently and points in different directions. The direction of each PRS resource is described by a horizontal dimension angle $\varphi$ and a vertical dimension angle $\theta$, and the values of the angles are determined by the gNB base station itself.

302: The LMF configures the UE to report the Relative Signal Time Difference (RSTD) measurement of P=3 gNBs (gNB base station 0, gNB base station 1 and gNB base station 2 in the figure), and indicates the PRS resource configuration information of the above base stations to the UE, and at the same time, indicates that the gNB base station 0 is the reference gNB base station and the PRS resource 1 is the reference resource.

303-304: The UE terminal measures the PRSs sent by the gNB base station 0, the gNB base station 1 and the gNB base station 2, and sends the PRS time measurements to the LMF.

In this step, when the UE terminal performs the PRS measurement and reporting, for the PRS resource 1 of the gNB base station 0, the Time Of Arrival (TOA) value of the first path is obtained by measurement; for the gNB base station 1, the TOA of the first path of an optimal PRS resource is determined among M=8 PRS resources, for example, the TOA of the first path of the PRS resource 2 is obtained by measurement, and the difference between this TOA and the TOA of the reference resource (PRS resource 1) is reported as the RSTD of the gNB base station 1. Similarly, for the gNB base station 2, the TOA of the first path of an optimal PRS resource (for example, the TOA of the first path of the PRS resource 6) is determined among M=8 PRS resources, and the difference between this TOA and the TOA of the reference resource is reported as the RSTD of the gNB base station 2.

305a-305c: after receiving the PRS measurements reported by the UE terminal, the LMF positioning server instructs the gNB base station to feed back the horizontal dimension angle and the vertical dimension angle corresponding to the PRS with the corresponding index according to the PRS resource index fed back by the UE terminal. For example, the gNB base station 0 is instructed to report the angle information $(\varphi_1^0, \theta_2^1)$ of the PRS resource 1, the gNB base station 1 is instructed to report the angle information $(\varphi_2^1, \theta_2^1)$ of the PRS resource 2, and the gNB base station 2 is instructed to report the angle information $(\varphi_6^2, \theta_6^2)$ of the PRS resource 6.

306: The LMF positioning server associates the PRS measurements reported by the UE terminal with the angle information corresponding to the PRS resources reported by the gNB base stations (gNB base station 0, gNB base station 1 and gNB base station 2 in the figure), and calculates the position of the UE based on the above information, and position the terminal.

In the above process, since the LMF positioning server uses the PRS time measurement reported by the UE terminal and the PRS angle information reported by the gNB base station at the same time when positioning the UE terminal, the positioning accuracy of the UE terminal can be improved.

Figure 4:
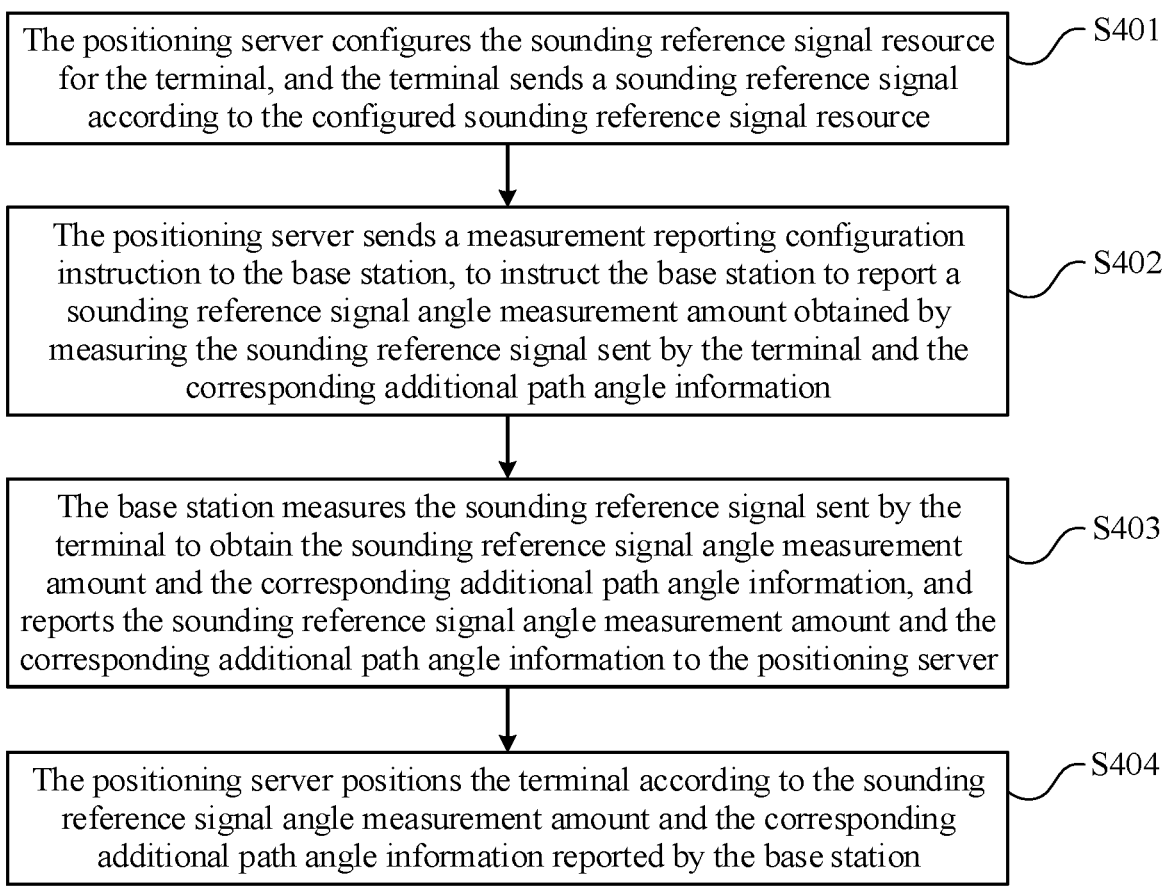
FIG. 4 and FIG. 5 are schematic diagrams of an uplink positioning process according to an embodiment of the present application.

Referring to FIG. 4, it is a schematic diagram of an uplink positioning process according to an embodiment of the present application. This process describes a process in which the base station measures an uplink reference signal (hereinafter referred to as SRS) sent by the terminal and reports a positioning measurement and the corresponding additional path angle information, and the positioning server positions the terminal according to the SRS measurement and the corresponding additional path angle information reported by the base station.

S401: The positioning server configures the SRS resource for the terminal, and the terminal sends an SRS according to the configured SRS resource.

In this step, the positioning server may configure one or more SRS resources for the terminal.

Each SRS resource may correspond to one direction, and different SRS resources correspond to different directions. The direction corresponding to the SRS resource may be described by the angle information, which may include at least one of a horizontal dimension angle and a vertical dimension angle.

In some embodiments, the SRS angle information corresponding to one SRS resource is determined by the terminal.

S402: The positioning server sends a measurement reporting configuration instruction to the base station, where the measurement reporting configuration instruction is used to instruct the base station to report an SRS angle measurement obtained by measuring the SRS sent by the terminal and the corresponding additional path angle information.

Here, the SRS angle measurement may include an angle measurement corresponding to one or more SRS resources, and the angle measurement corresponding to one SRS resource may include at least one of A-AoA and Z-AoA.

The additional path angle information may include: a horizontal dimension angle and/or a vertical dimension angle of each path, that is, at least one of A-AoA and Z-AoA of each path. After measuring and obtaining the angle information corresponding to the SRS resource, the base station can obtain the angle information of each additional path corresponding to the SRS resource, and report it to the positioning server.

S403: The base station measures the SRS sent by the terminal to obtain the SRS angle measurement and the corresponding additional path angle information, and reports the SRS angle measurement and the corresponding additional path angle information to the positioning server.

S404: The positioning server positions the terminal according to the SRS angle measurement and the corresponding additional path angle information reported by the base station.

In this step, after receiving the SRS angle measurement and the corresponding additional path angle information reported by the base station, the positioning server positions the terminal according to the information reported by the base station.

It should be noted that the execution sequence of all the steps in the process shown in FIG. 4 is only an example, for example, the sequence of S401 and S402 is not strictly required. In some scenarios, after the positioning server configures the SRS resource for the terminal, the terminal may send the SRS according to the configuration of the positioning server for a period of time until the positioning server configures the new SRS resource or instructs the terminal to stop sending the SRS. During this period, one terminal may be positioned multiple times, or the terminals may be positioned.

As can be seen from the above description, in the above embodiment of the present application, the base station also reports the angle information of the additional path while reporting the angle measurement, and the positioning server can not only rely on the angle measurement reported by the base station but also rely on the angle information of the corresponding additional path when positioning the terminal. Compared with the traditional terminal positioning method, the basis for positioning the terminal is increased in the embodiment of the present application, so the positioning accuracy can be improved.

Figure 5:
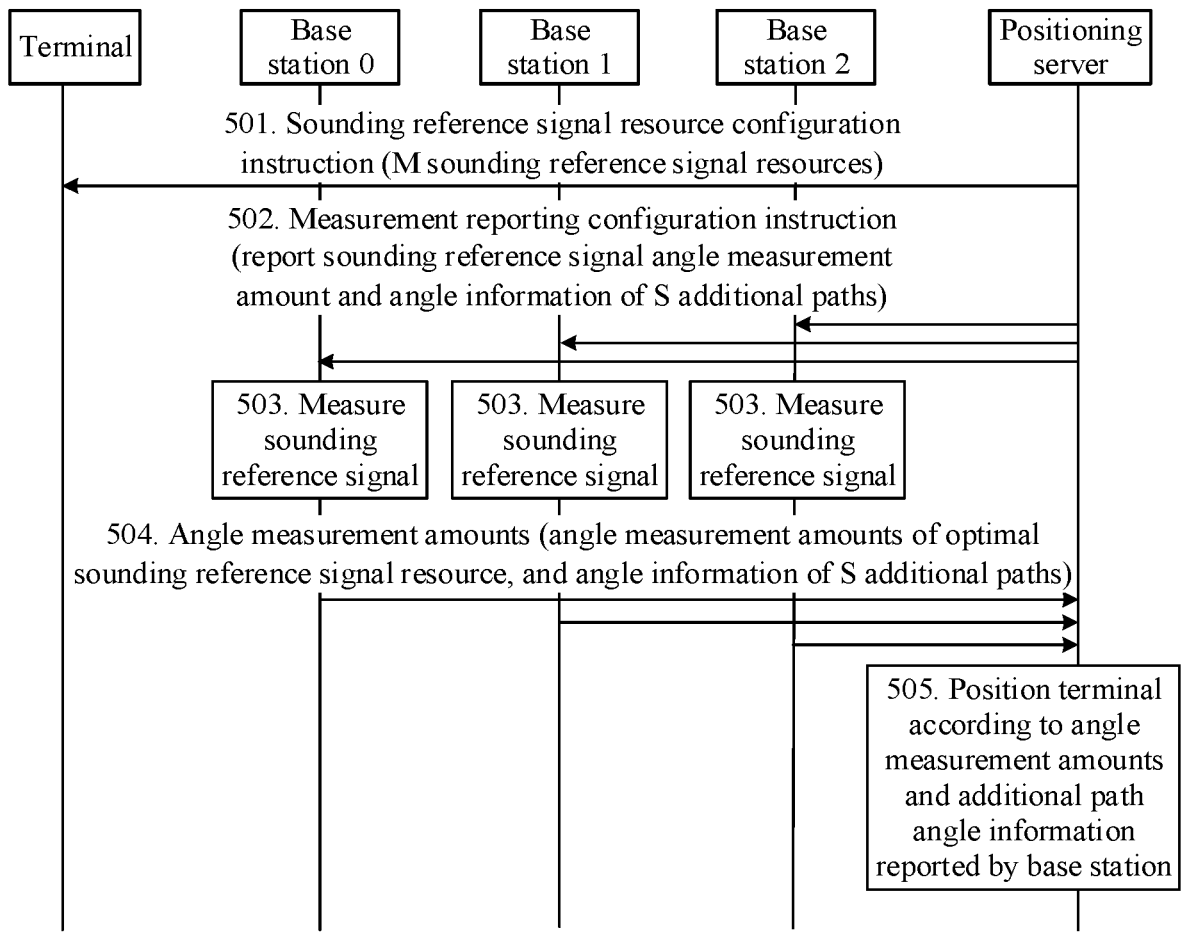

Based on the uplink positioning process shown in FIG. 4, FIG. 5 exemplarily shows the UL-AoA positioning process by taking the UL-AoA positioning technology as an example. As shown in FIG. 5, the process may include followings.

501: The LMF positioning server configures the UE terminal to transmit M=8 SRS resources, where each SRS resource is formed differently and points to different directions.

502: The LMF positioning server configures each of P=3 gNB base stations (gNB base station 0, gNB base station 1 and gNB base station 2 in the figure) to report angle measurements and measurements of S=2 additional paths. The angle measurements include an Azimuth Angle of Arrival (A-AoA) and a Zenith Angle of Arrival (Z-AoA), and the measurements of the additional path include an Azimuth Angle of Arrival (A-AoA$^{mp}$) and a Zenith Angle of Arrival (Z-AoA$^{mp}$) of each additional path.

503-504: The gNB base station (gNB base station 0, gNB base station 1 and gNB base station 2 in the figure) measures the SRS sent by the UE terminal to obtain the A-AoA and Z-AoA and the A-AoA$^{mp}$ and Z-AoA$^{mp}$ of the corresponding two additional paths, and reports them to the LMF positioning server.

In this step, the gNB base station 0 determines an optimal SRS resource among M=8 SRS resources, and takes its first path as the angle measurements {A-AoA$_0$, Z-AoA$_0$} of the gNB base station 0, and at the same time, reports the angle information {A—AoA$_{0,0}^{mp}$, Z—AoA$_{0,0}^{mp}$} and {A—AoA$_{0,1}^{mp}$, Z—AoA$_{0,1}^{mp}$)} of S=2 additional paths of this SRS resource. Similarly, the gNB base station 1 determines an optimal SRS resource among M=8 SRS resources, and reports its angle measurements {A-AoA$_1$, Z-AoA$_1$} and the measurements {A—AoA$_{1,0}^{mp}$, Z—AoA$_{1,0}^{mp}$} and {A—AoA$_{1,1}^{mp}$, Z—AoA$_{1,1}^{mp}$} of S=2 additional paths. In a similar manner, the gNB2 reports the angle measurements {A-AoA$_2$, Z-AoA$_2$} and the measurements {A—AoA$_{2,0}^{mp}$, Z—AoA$_{2,0}^{mp}$)} and {A—AoA$_{2,1}^{mp}$, Z—AoA$_{2,1}^{mp}$} of the corresponding additional path.

505: After receiving the positioning measurements reported by the three gNB base stations, the LMF positioning server adopts a position calculation algorithm based on angle information to obtain the position information of the UE.

In the above process, since the LMF positioning server uses the SRS angle measurement and the measurement of the corresponding additional path reported by the gNB base station at the same time when positioning the UE terminal, the positioning accuracy of the UE terminal can be improved.

Figure 6:
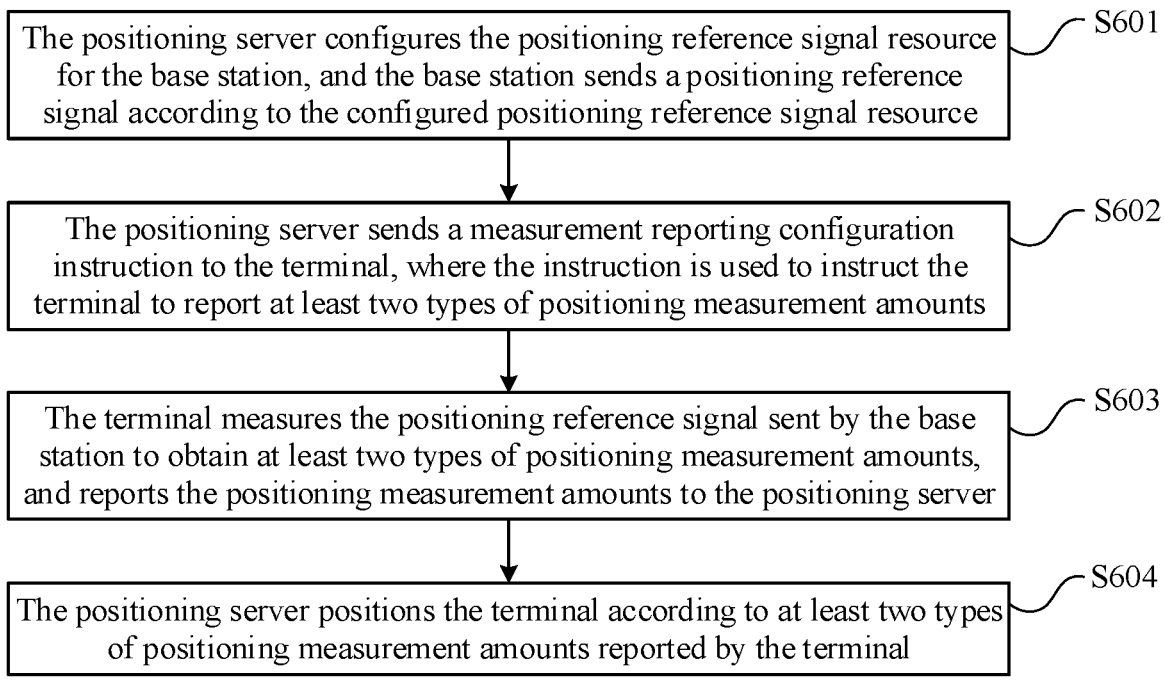
FIG. 6, FIG. 7 and FIG. 8 are schematic diagrams of a downlink positioning process according to another embodiment of the present application.

Referring to FIG. 6, it is a downlink positioning process according to another embodiment of the present application. This process describes a process in which the terminal measures a downlink positioning reference signal (hereinafter referred to as PRS) and reports positioning measurements that include at least two types of positioning measurements, and the positioning server positions the terminal according to the at least two types of positioning measurements reported by the terminal.

As shown in FIG. 6, the process may include followings.

S601: The positioning server configures the PRS resource for the base station, and the base station sends a PRS according to the configured PRS resource.

In this step, the positioning server may configure one or more PRS resources for the base station. Each PRS resource may correspond to one direction, and different PRS resources correspond to different PRS directions.

S602: The positioning server sends a measurement reporting configuration instruction to the terminal, where the measurement reporting configuration instruction is used to instruct the terminal to report at least two types of positioning measurements.

Here, the at least two types of positioning measurements include at least two of a time measurement, an angle measurement and a power measurement. For example, the at least two types of positioning measurements include at least a PRS time measurement and a PRS angle measurement, or at least a PRS angle measurement and a PRS power measurement.

Here, the time measurement may include information such as TOA and RSTD; the angle measurement may include information such as A-AoA and Z-AoA; and the power measurement may include information such as RSRP.

S603: The terminal measures the PRS sent by the base station to obtain at least two types of positioning measurements, and reports the positioning measurements to the positioning server.

In this step, among the positioning measurements reported by the terminal, the number of each type of positioning measurements may be one or more. For example, the positioning measurements reported by the terminal include angle measurements, which may include $(A\text{-}AoA_{00}, Z\text{-}AoA_{00})$ of the PRS signal measured at the moment t0 and $(A\text{-}AoA_{01}, Z\text{-}AoA_{01})$ of the PRS signal measured at the moment t1.

In some embodiments, among the at least two types of positioning measurements reported by the terminal, one type of positioning measurement is associated with at least one positioning measurement of another type. For example, the positioning measurements reported by the terminal include the time measurement RSTD and the angle measurements (A-AoA, Z-AoA) obtained by measuring one PRS resource of a base station, and then the time measurement RSTD is associated with the angle measurements (A-AoA, Z-AoA), as the positioning measurements corresponding to the PRS resource of the base station to position the terminal.

In other embodiments, among the at least two types of positioning measurements reported by the terminal, one type of positioning measurement is associated with at least two other types of positioning measurements. For example, the positioning measurements reported by the terminal include the time measurement RSTD, the angle measurements (A-AoA, Z-AoA) and the power measurement RSRP obtained by measuring one PRS resource of a base station, and then the time measurement RSTD is associated with the angle measurements (A-AoA, Z-AoA) and the power measurement RSRP, as the positioning measurements corresponding to the PRS resource of the base station to position the terminal.

S604: The positioning server positions the terminal according to at least two types of positioning measurements reported by the terminal.

In some embodiments of the present application, the at least two types of positioning measurements reported by the terminal may further include: a measurement of an additional path corresponding to the time measurement, angle measurement or power measurement, and the additional path corresponding to the time measurement, angle measurement or power measurement of one PRS resource refers to one or more of the additional paths corresponding to the PRS resource, and the reported number of additional paths may be configured by the positioning server or pre-defined by system. The measurement of one additional path may include at least one of a time measurement, an angle measurement and a power measurement of the additional path. The type of the measurement of one additional path may be configured by the positioning server or pre-defined by system.

Among the measurements of the additional paths reported by the terminal, the numbers of measurements of different paths are the same or different. For example, for a PRS resource of a base station, the measurements of the corresponding first additional path include time measurements and angle measurements, and the measurements of the corresponding second additional path only include time measurements. For another example, for a PRS resource of a base station, the measurements of the corresponding first additional path include three time measurements, and the measurements of the corresponding second additional path only include one time measurement.

In some embodiments, the measurement of each of additional paths is associated with the measurement of at least one additional path of another type. For example, the measurements reported by the terminal include an angle measurement of the additional path 1 corresponding to the first PRS resource for a base station and two time measurements of the additional path 1, and then the angle measurement of the additional path 1 may be associated with the two time measurements of the additional path, as the measurements of the additional path corresponding to the PRS resource of the base station to position the terminal.

In other embodiments, the measurement for each of additional paths is associated with the measurements of at least two other types of additional paths. For example, the measurements reported by the terminal include the time measurement, angle measurement and power measurement of the additional path 1 corresponding to the first PRS resource for a base station, and then the time measurement, angle measurement and power measurement of the additional path 1 may be associated as the measurements of the additional path corresponding to the PRS resource of the base station to position the terminal.

In an embodiment of the present application, the reporting manner of the measurements of the additional path may be configured by the positioning server, or predefined by the system, or determined by the terminal, and the reporting manner of the measurements of the additional path includes the association manner provided in the above embodiment, and of course, may also include other reporting manners, for example, the measurements of the additional path are independently reported, that is, for each additional path of a PRS resource, the index of the PRS resource, the additional path index and the measurements of each additional path are reported.

In some embodiments, the base station may also report the PRS angle information to assist the positioning server in positioning the terminal. In some embodiments, the base station can configure PRS resources according to the instruction of the positioning server, and determine the direction corresponding to each PRS resource. The PRS direction corresponding to the PRS resource can be described by the angle information, which may include at least one of a horizontal dimension angle and a vertical dimension angle. The base station can report the PRS angle information corresponding to all or some of the configured PRS resources to the positioning server according to the instruction of the positioning server, and the positioning server combines the positioning measurement reported by the terminal with the PRS angle information reported by the base station to position the terminal, and some of the PRS resources are determined by the PRS resource information included in the positioning measurement reported by the terminal. For the method for the base station to report the angle information corresponding to the PRS resource, reference may be made to the relevant part of the foregoing embodiment, which will not be repeated here.

After receiving the positioning measurement reported by the terminal and the angle information corresponding to the PSR resource reported by the base station, the positioning server may associate the positioning measurement reported by the terminal with the PRS angle information corresponding to the corresponding PRS resource reported by the corresponding base station according to the base station and PRS resource corresponding to the positioning measurement reported by the terminal, to position the terminal.

It should be noted that the execution sequence of all the steps in the process shown in FIG. 6 is only an example, for example, the sequence of S601 and S602 is not strictly required. In some scenarios, after the positioning server configures the PRS resource for the base station, the base station may send the PRS according to the configuration of the positioning server for a period of time until the positioning server configures the new PRS resource or instructs the base station to stop sending the PRS. During this period, one terminal may be positioned multiple times, or the terminals may be positioned.

As can be seen from the above description, in the above embodiments of the present application, the positioning measurements reported by the terminal include at least two types, and the positioning server can position the terminal according to various types of positioning measurements when positioning the terminal. Compared with the traditional terminal positioning method, the basis for positioning the terminal is increased in the embodiment of the present application, so the positioning accuracy can be improved.

Figure 7:
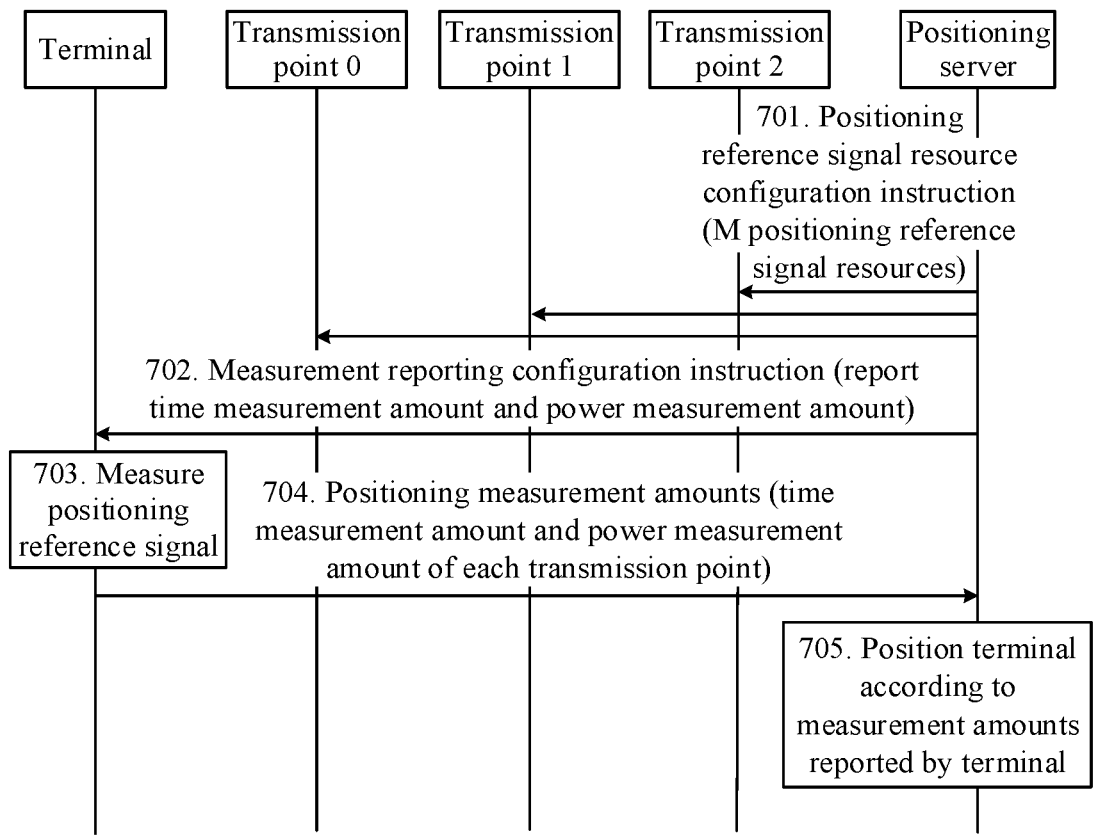

Based on the downlink positioning process shown in FIG. 6, FIG. 7 exemplarily shows the DL-AOD positioning process by taking the DL-AOD positioning technology as an example. As shown, the process may include followings.

701: The LMF positioning server configures each TRP transmission point (such as TRP transmission point 0, TRP transmission point 1 and TRP transmission point 2 in the figure) to configure M=8 PRS resources.

Each PRS resource is formed differently and points in different directions.

702: The LMF positioning server configures the UE to report the measurements for P=3 TRP transmission points (such as TRP transmission point 0, TRP transmission point 1 and TRP transmission point 2 in the figure), and each TRP transmission point reports N=2 types of measurements, where the first type is the time measurement TOA and the second type is the power measurement RSRP. The system pre-defines the time measurement and power measurement of each PRS resource reported by the UE terminal.

703-704: The UE terminal measures the PRSs sent by the TRP transmission point 0, TRP transmission point 1 and TRP transmission point 2, and sends the time measurement TOA and the power measurement RSRP of each PRS resource of each TRP transmission point to the LMF positioning server.

In this step, when the UE terminal performs measurement reporting, for M=8 PRS resources of the TRP transmission point 0, the RSRP and TOA of each PRS resource are respectively measured to obtain 8 RSRP measurement values and 8 TOA measurement values, denoted as $RSRP_i$ and $TOA_i (i=0, \ldots, 7)$ respectively. Thus, for TRP0, the reported information of the UE includes:

PRS resource 0: $RSRP_0$, $TOA_0$;
PRS resource 1: $RSRP_1$, $TOA_1$;
...
PRS resource 7: $RSRP_7$, $TOA_7$;

and $RSRP_i$ is associated with $TOA_i$, representing the power information and time information of the PRS resource i.

The reporting of the positioning measurements of TRP1 and TRP2 is similar to this, and will not be repeated here.

705: After receiving the positioning measurements reported by the UE terminal for the PRSs sent by the three TRP transmission points (such as TRP transmission point 0, TRP transmission point 1 and TRP transmission point 2 in the figure), the LMF positioning server uses the time and angle joint positioning solution method to obtain the position information of the UE terminal according to the association relationship among the positioning measurements. This embodiment of the present application does not limit the time and angle joint positioning solution algorithm used.

In the above process, since the LMF positioning server uses multiple types of positioning measurements reported by the UE terminal at the same time when positioning the UE terminal, the positioning accuracy of the UE terminal can be improved.

In other embodiments, for the PRS resource with low RSRP, the TOA may be estimated inaccurately, so the UE terminal can determine the reporting quantity of each PRS resource by itself. For example, for some PRS resources (such as PRS resource 1 and PRS resource 2) of the TRP transmission point 0, the RSRP is low, which may cause the TOA estimation of the PRS resource to be inaccurate. In this case, the positioning measurements reported by the UE terminal include:

PRS resource 0: $RSRP_0$, $TOA_0$;
PRS resource 1: $RSRP_1$;
PRS resource 2: $RSRP_2$;
...
PRS resource 7: $RSRP_7$, $TOA_7$;

and the TOA measurements of the PRS resource 1 and PRS resource 2 are not accurate, so the TOAs corresponding to these PRS resources are not reported.

In other embodiments of the present application, the TOA measurements (such as TOA measurements at different moments) may be reported for one PRS resource. Thus, for the PRS resource with low RSRP, reporting the TOAs can increase the accuracy of the corresponding time information. For example, for TRP0, the reported information of the UE includes:

PRS resource 0: $RSRP_0$, $TOA_{00}$, $TOA_{01}$;
PRS resource 1: $RSRP_1$, $TOA_{10}$, $TOA_{11}$;
...
PRS resource 7: $RSRP_7$, $TOA_{70}$, $TOA_{71}$;

and $RSRP_i$ is associated with $TOA_{10}$ and $TOA_{i1}$, representing the power information and time information of the PRS resource i.

Figure 8:
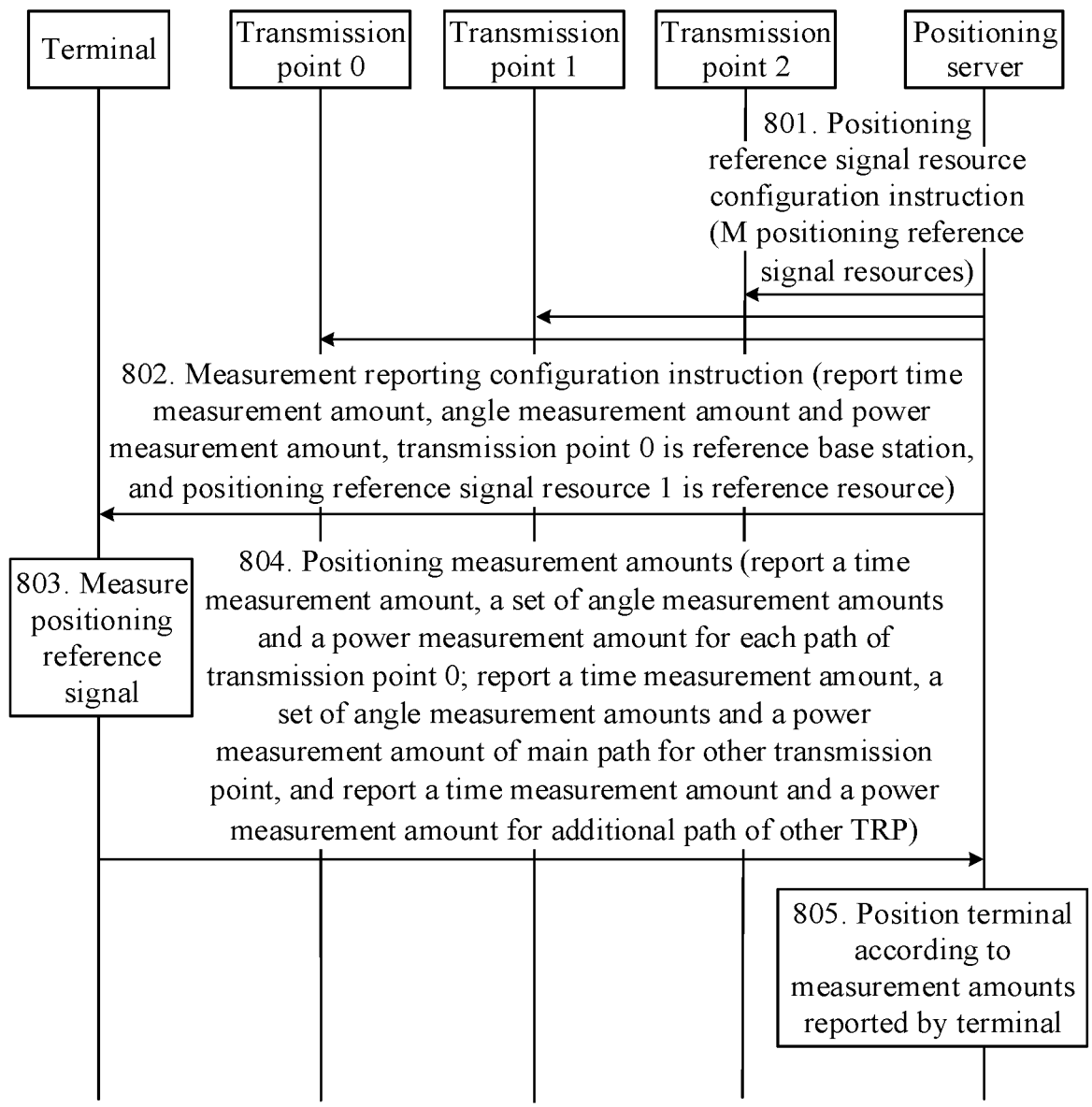

Based on the downlink positioning process shown in FIG. 6, FIG. 8 exemplarily shows the DL-TDOA positioning process by taking the DL-TDOA positioning technology as an example. As shown, the process may include followings.

801: The LMF positioning server configures each TRP transmission point (such as TRP transmission point 0, TRP transmission point 1 and TRP transmission point 2 in the figure) to configure M=8 PRS resources.

Each PRS resource is formed differently and points in different directions.

802: The LMF positioning server configures the UE terminal to report the measurements for P=3 TRP transmission points (such as TRP transmission point 0, TRP transmission point 1 and TRP transmission point 2 in the figure), and each TRP transmission point reports N=3 types of measurements, where the first type is the time measurement RSTD, the second type is the angle measurements A-AoA and Z-AoA, and the third type is the power measurement RSRP.

The LMF positioning server indicates the PRS resource configuration information of the TRP transmission points to the UE terminal, and at the same time indicates that the TRP transmission point 0 is the reference TRP transmission point and the PRS resource 1 is the reference resource. The LMF positioning server configures the UE terminal to report a time measurement, a set of angle measurements and a power measurement for each path of the reference TRP transmission point, and also configures the UE to report a time measurement, a set of angle measurements and a power measurement for only the main path of other TRP transmission point and report a time measurement and a power measurement for an additional path of other TRP transmission point.

803-804: The UE terminal measures the PRSs sent by the TRP transmission point 0, TRP transmission point 1 and TRP transmission point 2, and sends the time measurement, angle measurement and power measurement of the PRS resource of each TRP transmission point to the LMF positioning server.

In this step, when performing measurement reporting, the UE terminal reports the TOA measurement values of S=2 additional paths for the PRS resource 1 of the TRP transmission point 0, and reports a set of A-AoA and Z-AoA and the RSRP measurement for each additional path. In this way, the UE reports the following information for TRP0:

Main-path: $TOA_0$, A-$AoA_0$, Z-$AoA_0$, $RSRP_0$;
additional-path-1: $TOA_1$, A-$AoA_1$, Z-$AoA_1$, $RSRP_1$;
additional-path-2: $TOA_2$, A-$AoA_2$, Z-$AoA_2$, $RSRP_2$.

For the TRP transmission point 1, the UE terminal determines the TOA of the first path of the optimal PRS resource among M=8 PRS resources, reports the difference between this TOA and the TOA of the reference resource as the RSTD of the TRP transmission point 1, and determines the angle measurement and power measurement of this path; and at the same time, determines the TOA measurement values of S=2 additional paths of the optimal PRS resource, and determines the power measurement of each path. In this way, the UE terminal reports the following information for the TRP transmission point 1:

Main-path: RSTD, A-$AoA_0$, Z-$AoA_0$, $RSRP_0$;
additional-path-1: $TOA_1$, $RSRP_1$;
additional-path-2: $TOA_2$, $RSRP_2$.

The reporting of the TRP transmission point 2 is similar to that of the TRP transmission point 1, and will not be repeated here.

805: After receiving the positioning measurements reported by the UE terminal for the PRSs sent by the three TRP transmission points (such as TRP transmission point 0, TRP transmission point 1 and TRP transmission point 2 in the figure), the LMF positioning server uses the time and angle joint positioning solution method to obtain the position information of the UE terminal according to the association relationship among the positioning measurements.

In the above process, since the LMF positioning server uses multiple types of positioning measurements reported by the UE terminal at the same time when positioning the UE terminal, the positioning accuracy of the UE terminal can be improved.

Figure 9:
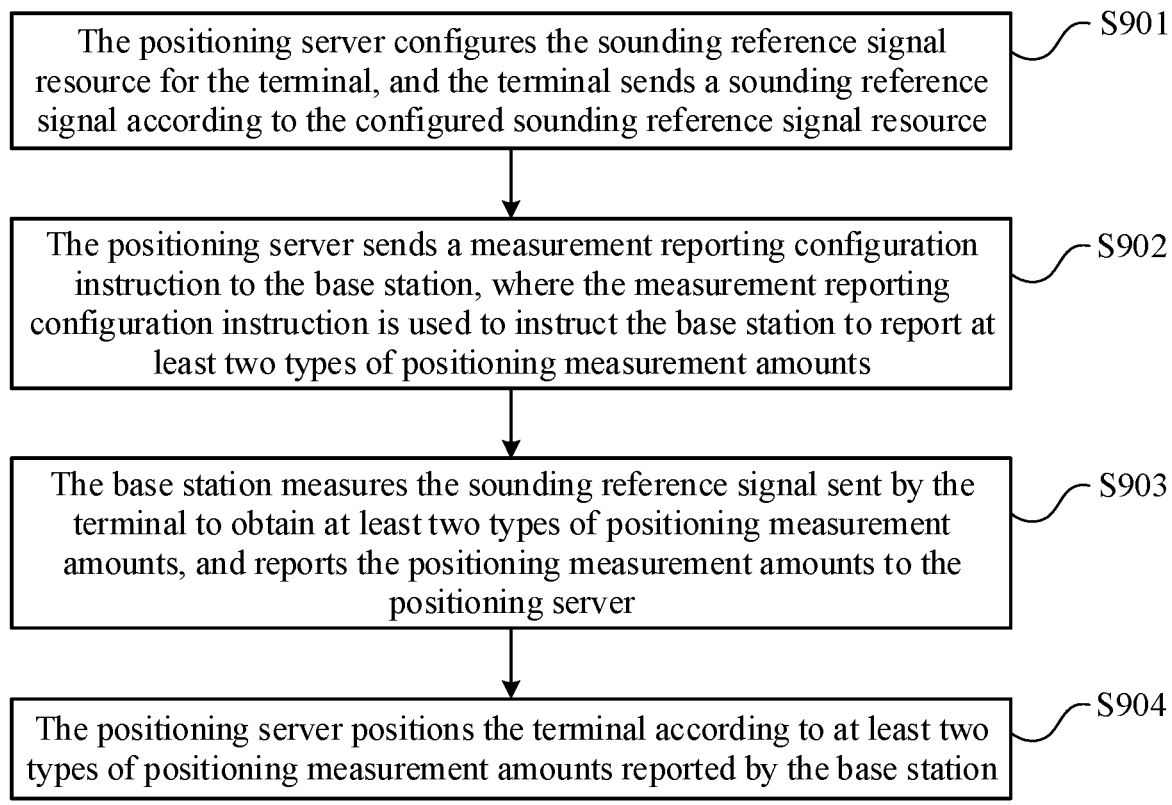
FIG. 9 and FIG. 10 are schematic diagrams of an uplink positioning process according to another embodiment of the present application.

Referring to FIG. 9, it is an uplink positioning process according to another embodiment of the present application. This process describes a process in which the base station measures an uplink positioning reference signal (hereinafter referred to as SRS) and reports positioning measurements that include at least two types of positioning measurements, and the positioning server positions the terminal according to the at least two types of positioning measurements reported by the base station.

As shown, the process may include followings.

S901: The positioning server configures the SRS resource for the terminal, and the terminal sends an SRS according to the configured SRS resource.

In this step, the positioning server may configure one or more SRS resources for the terminal.

Each SRS resource may correspond to one direction, and different SRS resources correspond to different directions. The direction corresponding to the SRS resource may be described by the angle information, which may include at least one of a horizontal dimension angle and a vertical dimension angle.

In some embodiments, the SRS angle information corresponding to one SRS resource is determined by the terminal.

S902: The positioning server sends a measurement reporting configuration instruction to the base station, where the measurement reporting configuration instruction is used to instruct the base station to report at least two types of positioning measurements.

Here, the at least two types of positioning measurements include at least two of a time measurement, an angle measurement and a power measurement. For example, the at least two types of positioning measurements include at least an SRS time measurement and an SRS angle measurement, or at least an SRS angle measurement and an SRS power measurement.

Here, the time measurement may include information such as TOA and RSTD; the angle measurement may include information such as A-AoA and Z-AoA; and the power measurement may include information such as RSRP.

S903: The base station measures the SRS sent by the terminal to obtain at least two types of positioning measurements, and reports the positioning measurements to the positioning server.

In this step, among the positioning measurements reported by the base station, the number of each type of positioning measurements may be one or more. For example, the positioning measurements reported by the base station include angle measurements, which may include (A-AoA$_{00}$, Z-AoA$_{00}$) of the SRS signal measured at the moment t0 and (A-AoA$_{01}$, Z-AoA$_{01}$) of the SRS signal measured at the moment t1.

In some embodiments, among the at least two types of positioning measurements reported by the base station, one type of positioning measurement is associated with at least one positioning measurement of another type. For example, the positioning measurements reported by the base station include the time measurement RSTD and the angle measurements (A-AoA, Z-AoA) obtained by measuring one SRS resource of a terminal, and then the time measurement RSTD is associated with the angle measurements (A-AoA, Z-AoA), as the positioning measurements corresponding to the SRS resource of the terminal to position the terminal.

In other embodiments, among the at least two types of positioning measurements reported by the base station, one type of positioning measurement is associated with at least two other types of positioning measurements. For example, the positioning measurements reported by the base station include the time measurement RSTD, the angle measurements (A-AoA, Z-AoA) and the power measurement RSRP obtained by measuring one SRS resource of a terminal, and then the time measurement RSTD is associated with the angle measurements (A-AoA, Z-AoA) and the power measurement RSRP, as the positioning measurements corresponding to the SRS resource of the terminal to position the terminal.

S904: The positioning server positions the terminal according to at least two types of positioning measurements reported by the base station.

In some embodiments of the present application, the at least two types of positioning measurements reported by the base station may further include: a measurement of an additional path corresponding to the time measurement, angle measurement or power measurement, and the additional path corresponding to the time measurement, PRS angle measurement or power measurement of one SRS resource refers to one or more of the additional paths corresponding to the SRS resource, and the reported number of additional paths may be configured by the positioning server or pre-defined by system. The measurement of one additional path may include at least one of a time measurement, an angle measurement and a power measurement of the additional path. The type of the measurement of one additional path may be configured by the positioning server or pre-defined by system.

Among the measurements of additional paths reported by the base station, the numbers of measurements of different paths are the same or different. For example, for an SRS resource of a terminal, the measurements of the corresponding first additional path include time measurements and angle measurements, and the measurements of the corresponding second additional path only include time measurements. For another example, for an SRS resource of a terminal, the measurements of the corresponding first additional path include three time measurements, and the measurements of the corresponding second additional path only include one time measurement.

In some embodiments, the measurement of each of additional paths is associated with the measurement of at least one additional path of another type. For example, the measurements reported by the base station include an angle measurement of the additional path 1 corresponding to the first SRS resource for a terminal and two time measurements of the additional path 1, and then the angle measurement of the additional path 1 may be associated with the two time measurements of the additional path, as the measurements of the additional path corresponding to the first SRS resource of the base station to position the terminal.

In other embodiments, the measurement for each of additional paths is associated with the measurements of at least two other types of additional paths. For example, the measurements reported by the base station include the time measurement, angle measurement and power measurement of the additional path 1 corresponding to the first SRS resource for a terminal, and then the time measurement, angle measurement and power measurement of the additional path 1 may be associated as the measurements of the additional path corresponding to the SRS resource of the terminal to position the terminal.

In an embodiment of the present application, the reporting manner of the measurements of the multi-path may be configured by the positioning server, or predefined by the system, or determined by the terminal, and the reporting manner of the measurements of the multi-path includes the association manner provided in the above embodiment, and of course, may also include other reporting manners, for example, the measurements of the multi-path are independently reported, that is, for each additional path of an SRS resource, the index of the SRS resource, the additional path index and the measurements of each additional path are reported.

It should be noted that the execution sequence of all the steps in the process shown in FIG. 9 is only an example, for example, the sequence of S901 and S902 is not strictly required. In some scenarios, after the positioning server configures the SRS resource for the terminal, the terminal may send the SRS according to the configuration of the positioning server for a period of time until the positioning server configures the new SRS resource or instructs the terminal to stop sending the SRS. During this period, the terminal can be positioned multiple times.

As can be seen from the above description, in the above embodiment of the present application, the positioning measurements reported by the base station include at least two types, and the positioning server can position the terminal according to various types of positioning measurements when positioning the terminal. Compared with the traditional terminal positioning method, the basis for positioning the terminal is increased in the embodiment of the present application, so the positioning accuracy can be improved.

Figure 10:
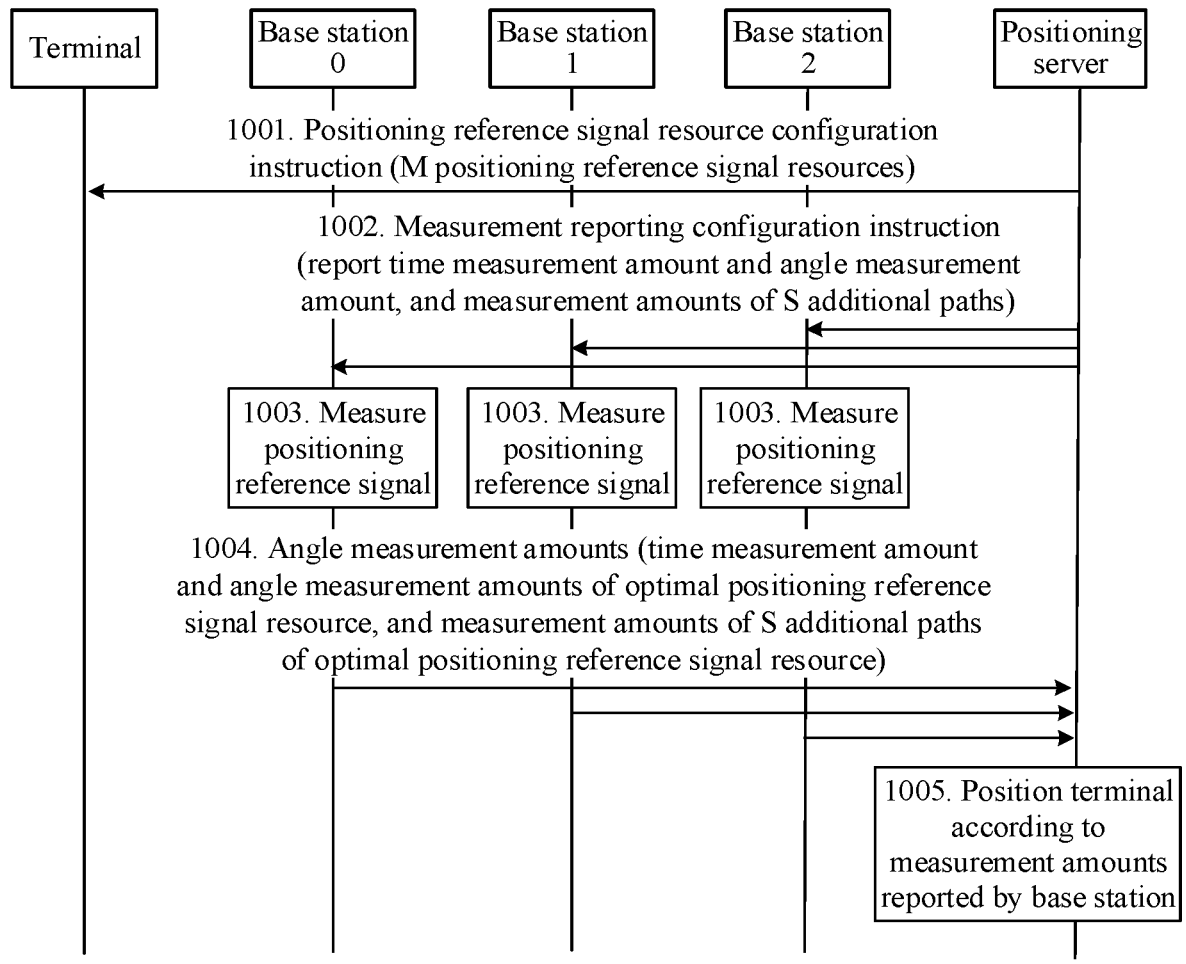

Based on the uplink positioning process shown in FIG. 9, FIG. 10 exemplarily shows the UL-TDOA positioning process by taking the UL-TDOA positioning technology as an example.

1001: The LMF positioning server configures the UE terminal to transmit M=8 SRS resources, where each SRS resource is shaped differently and points to different directions.

1002: The LMF positioning server configures P=3 gNB base stations (gNB base station 0, gNB base station 1 and gNB base station 2 in the figure) to report N=2 types of measurements, where the first type is the time measurement RTOA, and the second type is the angle measurements A-AoA and Z-AoA.

The LMF positioning server instructs the gNB base station to report S=3 additional paths. And the system pre-defines that each path reports a set of angle measurements.

1003-1004: The gNB base station (gNB base station 0, gNB base station 1 and gNB base station 2 in the figure) measures the SRS sent by the UE terminal to obtain the time measurement and angle measurement, and reports them to the LMF positioning server.

In this step, the gNB base station 0 determines an optimal SRS resource among M=8 SRS resources, takes its first path as the RTOA of the gNB base station 0, and measures the angles of arrival A-AoA$_0$ and Z-AoA$_0$ of the first path in the horizontal and vertical dimensions. At the same time, it is determined that the TOA measurements of S=3 additional paths of the SRS resource are reported as the additional path information, which is represented as TOA$_i$. The TOA$_i$ of the additional path can be directly reported or reported in a differential manner with the RTOA of the first path. For each additional path, the gNB base station measures a set of angles of arrival A-AoA$_i$ and Z-AoA$_i$ in the horizontal and vertical dimensions. Therefore, the reported information of the gNB base station 0 is as follows:

Main-path: RTOA, A-AoA$_0$, Z-AoA$_0$;
additional-path-1: TOA$_1$, A-AoA$_1$, Z-AoA$_1$;
additional-path-2: TOA$_2$, A-AoA$_2$, Z-AoA$_2$;
additional-path-3: TOA$_3$, A-AoA$_3$, Z-AoA$_3$;
and RTOA is associated with A-AoA$_0$ and Z-AoA$_0$, representing the time information and angle information of the main path. Similarly, TOA$_i$ is associated with A-AoA$_i$ and Z-AoA$_i$, representing the time information and angle information of the additional path i. Similar reporting methods are adopted for the gNB base station 1 and gNB base station 2, and details are not repeated here.

1005: After receiving the positioning measurements reported by the gNB base stations (gNB base station 0, gNB base station 1 and gNB base station 2 in the figure), the LMF positioning server uses the time and angle joint positioning solution method to obtain the position information of the UE terminal according to the association relationship among the positioning measurements.

In the above process, since the LMF positioning server uses multiple types of positioning measurements reported by the gNB base stations at the same time when positioning the UE terminal, the positioning accuracy of the UE terminal can be improved.

In the UL-TDOA positioning process provided by other embodiments of the present application, the LMF positioning server may instruct the gNB base station to report only the angle information of the path corresponding to the RTOA, and the angle information of the additional path does not need to be reported. Thus, the information reported by the gNB base station 0 includes:

Main-path: RTOA, A-AoA$_0$, Z-AoA$_0$;
additional-path-1: TOA$_1$;
additional-path-2: TOA$_2$;
additional-path-3: TOA$_3$.

The gNB base station 1 and the gNB base station 2 adopt the similar reporting methods. In this way, the reporting overhead can be saved, and the positioning accuracy of the UE terminal can be improved by associating the time measurements of the additional paths with the angle measurement of the main path to position the UE terminal.

In other embodiments, the gNB base station can determine the reporting quantity of each path by itself according to the measurement result. For example, the angle measurements of the first path (main path) and the additional path 2 measured by the gNB base station 0 have the high quality, but the angle measurements of the additional path 1 and additional path 3 are inaccurately estimated. Thus, the gNB base station 0 may report the following information:

Main-path: RTOA, A-AoA$_0$, Z-AoA$_0$;
additional-path-1: TOA$_1$;
additional-path-2: TOA$_2$, A-AoA$_2$, Z-AoA$_2$;
additional-path-3: TOA$_3$.

In other embodiments, the system predefines that each path can report multiple sets of angle measurements. For example, each path reports two sets of angle measurements. In this case, the information reported by the gNB base station 0 includes:

Main-path: RTOA, A-AoA$_{00}$, Z-AoA$_{00}$, A-AoA$_{01}$, Z-AoA$_{01}$;
additional-path-1: TOA$_1$, A-AoA$_{10}$, Z-AoA$_{10}$, A-AoA$_{11}$, Z-AoA$_{11}$;
additional-path-2: TOA$_2$, A-AoA$_{20}$, Z-AoA$_{20}$, A-AoA$_{21}$, Z-AoA$_{21}$;
additional-path-3: TOA$_3$, A-AoA$_{30}$, Z-AoA$_{30}$, A-AoA$_{31}$, Z-AoA$_{31}$;
and RTOA is associated with (A-AoA$_{00}$, Z-AoA$_{00}$) and (A-AoA$_{01}$, Z-AoA$_{01}$), representing the time information and angle information of the first path (main path). Similarly, TOA$_i$ is associated with (A-AoA$_{i0}$, Z-AoA$_{i0}$) and (A-AoA$_{i1}$, Z-AoA$_{i1}$), representing the time information and angle information of the additional path i. After receiving the positioning measurements, the LMF may select one of two sets of angle measurement values for each path as the angle measurements of this path, for the positioning solution of the terminal position.

In other embodiments of the present application, each gNB base station may report the time measurement values, and each time measurement value is associated with multiple sets of angle measurement values. For example, each gNB base station reports two RTOA measurement values, and each RTOA is associated with two sets of angle measurement values. For each additional path, the gNB base station may report three time measurement values and two sets of angle measurement values. In this case, the information reported by the gNB base station 0 may include:

Main-path-1: RTOA$_0$, A-AoA$_{0,00}$, Z-AoA$_{0,00}$, A-AoA$_{0,01}$, Z-AoA$_{0,01}$;
additional-path-1: TOA$_{0,10}$, TOA$_{0,11}$, TOA$_{0,12}$, A-AoA$_{0,10}$, Z-AoA$_{0,10}$, A-AoA$_{11}$, Z-AoA$_{11}$;
additional-path-2: TOA$_{0,20}$, TOA$_{0,21}$, TOA$_{0,22}$, A-AoA$_{0,20}$, Z-AoA$_{0,20}$, A-AoA$_{0,21}$, Z-AoA$_{0,21}$;
additional-path-3: TOA$_{0,30}$, TOA$_{0,31}$, TOA$_{0,32}$, A-AoA$_{0,30}$, Z-AoA$_{0,30}$, A-AoA$_{0,31}$, Z-AoA$_{0,31}$;
Main-path-2: RTOA$_1$, A-AoA$_{1,00}$, Z-AoA$_{1,00}$, A-AoA$_{1,01}$, Z-AoA$_{1,01}$;
additional-path-1: TOA$_{1,10}$, TOA$_{1,11}$, TOA$_{1,12}$, A-AoA$_{1,10}$, Z-AoA$_{1,11}$, Z-AoA$_{1,11}$;
additional-path-2: TOA$_{1,20}$, TOA$_{1,21}$, TOA$_{1,22}$, A-AOA$_{1,20}$, Z-AOA$_{1,20}$, A-AoA$_{1,21}$, Z-AoA$_{1,21}$;
additional-path-3: TOA$_{1,30}$, TOA$_{1,31}$, TOA$_{1,32}$, A-AOA$_{1,30}$, Z-AOA$_{1,30}$, A-AOA$_{1,31}$, Z-AoA$_{1,31}$;
and RTOA is associated with A-AoA$_{j,00}$/Z-AoA$_{j,00}$ and A-AoA$_{j,01}$/Z-AoA$_{j,01}$ (j=0,1), representing the time information and angle information of the first path. Similarly, TOA$_{j,i0}$/TOA$_{j,i1}$/TOA$_{j,i2}$ is associated with A-AoA$_{j,i0}$/Z-Ao$_{j,i0}$ and A-Ao$_{j,i1}$/Z-Ao$_{j,i1}$, representing the time information and angle information of the additional path i. After receiving the positioning measurements reported by the gNB, the LMF may select one of two sets of angle measurements for each path as the angle measurements of this path, and select one of three time measurements as the time measurement of this path, for the positioning solution of the terminal position.

In other embodiments of the present application, when performing the SRS measurement and reporting, the gNB base station 0 may determine an optimal SRS resource among M=8 SRS resources, take the time measurement of its first path (main path) as the RTOA of the gNB base station 0, and measure the angles of arrival A-AoA$_0$/Z-AoA$_0$ of the first path in the horizontal and vertical dimensions. At the same time, it is determined that the TOA measurements of S=3 additional paths of the SRS resource are reported as the additional path information, which is represented as TOA$_i$ and can be directly reported or reported in a differential manner with the RTOA of the first path. For each additional path, the gNB base station measures a set of angles of arrival A-AoA$_i$/Z-AoA$_i$ in the horizontal dimension. Therefore, the reported information of the gNB0 is as follows:

Main-path: RTOA, A-AoA$_0$, Z-AoA$_0$;
additional-path-1: TOA$_1$, A-AoA$_1$, Z-AoA$_1$;
additional-path-2: TOA$_2$, A-AoA$_2$, Z-AoA$_2$;
additional-path-3: TOA$_3$, A-AoA$_3$, Z-AoA$_3$;
and RTOA is associated with A-AoA$_0$/Z-AoA$_0$, representing the time information and angle information of the first path (main path). Similarly, TOA$_i$ is associated with A-AoA$_i$/Z-AoA$_i$, representing the time information and angle information of the additional path i. Similar reporting methods are adopted for the gNB base station 1 and gNB base station 2, and details are not repeated here.

An embodiment of the present application further provides a positioning server.

Figure 11:
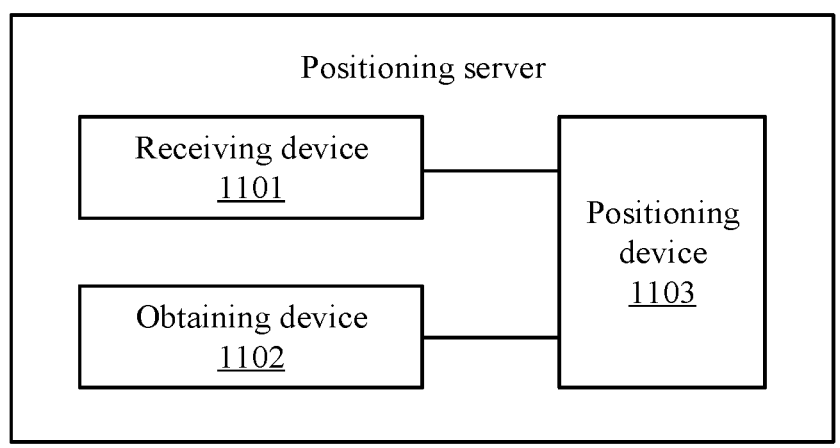
FIG. 11 is a structural schematic diagram of a positioning server according to an embodiment of the present application.

Referring to FIG. 11, which is a structural schematic diagram of a positioning server according to an embodiment of the present application, the positioning server can implement the functions implemented by the positioning server in FIG. 2 and FIG. 3. As shown in the figure, the positioning server may include: a receiving device 1101, an obtaining device 1102, and a positioning device 1103, and the receiving device 1101 is configured to receive positioning measurement information reported by a terminal, and the positioning measurement information includes downlink positioning reference signal resource information and a downlink positioning reference signal measurement corresponding to the downlink positioning reference signal resource information;

the obtaining device 1102 is configured to obtain downlink positioning reference signal angle information corresponding to the downlink positioning reference signal resource information reported by a base station;

the positioning device 1103 is configured to position the terminal according to the positioning measurement information reported by the terminal and the downlink positioning reference signal angle information reported by the base station.

In some embodiments, the obtaining device 1102 is specifically configured to: send an instruction to the base station corresponding to the downlink positioning reference signal resource information according to the downlink positioning reference signal resource information in the positioning measurement information reported by the terminal, and the instruction carries the downlink positioning reference signal resource information; and receive the downlink positioning reference signal angle information corresponding to the downlink positioning reference signal resource information carried in the instruction reported by the base station.

In some embodiments, an instruction device (not shown in the figure) is further included, which is configured to instruct the base station to determine corresponding downlink positioning reference signal angle information for all configured downlink positioning reference signal resources; and the receiving device 1101 is further configured to: receive downlink positioning reference signal angle information corresponding to all the downlink positioning reference signal resources reported by the base station.

In some embodiments, the downlink positioning reference signal resource information includes an index of a downlink positioning reference signal resource, or the downlink positioning reference signal resource information includes an index of a downlink positioning reference signal resource set.

In some embodiments, the downlink positioning reference signal angle information includes: a horizontal dimension angle and/or a vertical dimension angle of a downlink positioning reference signal.

It should be noted here that the above-mentioned positioning server provided in this embodiment of the present application can implement all the method steps implemented in the above-mentioned method embodiments. The parts and beneficial effects in this embodiment same as those in the method embodiments will not be described here in detail.

An embodiment of the present application further provides a base station.

Figure 12:
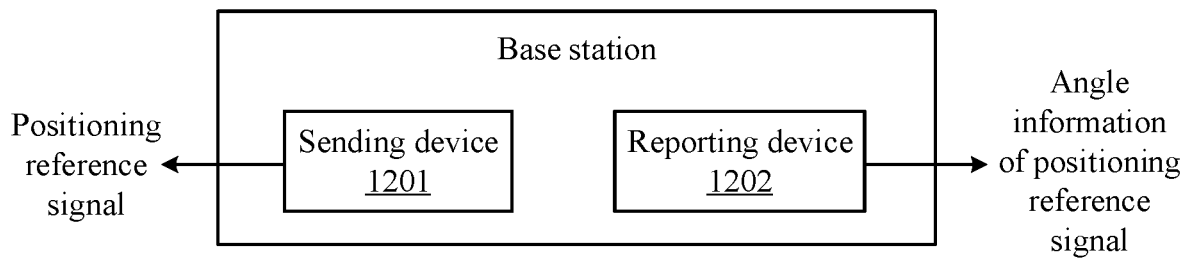
FIG. 12 is a structural schematic diagram of a base station according to an embodiment of the present application.

Referring to FIG. 12, which is a structural schematic diagram of a base station according to an embodiment of the present application, the base station can implement the functions implemented by the base station in FIG. 2 and FIG. 3. As shown in the figure, the base station may include: a sending device 1201 and a measurement reporting device 1202, and the sending device 1201 is configured to configure a downlink positioning reference signal resource and determine corresponding downlink positioning reference signal angle information, and send a downlink positioning reference signal according to the downlink positioning reference signal resource and the corresponding downlink positioning reference signal angle information;

the measurement reporting device 1202 is configured to report the downlink positioning reference signal angle information corresponding to the configured downlink positioning reference signal resource to a positioning server according to an indication of the positioning server, and the positioning server positions a terminal according to positioning measurement information reported by the terminal and the downlink positioning reference signal angle information reported by the base station, and the positioning measurement information includes downlink positioning reference signal resource information and a downlink positioning reference signal measurement corresponding to the downlink positioning reference signal resource information.

In some embodiments, a receiving device (not shown in the figure) is further included, which is configured to receive an instruction sent by the positioning server, and the instruction carries the downlink positioning reference signal resource information in the positioning measurement information reported by the terminal; and the measurement reporting device 1202 may send the downlink positioning reference signal angle information corresponding to the downlink positioning reference signal resource information carried in the instruction to the positioning server.

In some embodiments, the measurement reporting device 1202 may be specifically configured to: receive an instruction sent by the positioning server; and report downlink positioning reference signal angle information corresponding to all downlink positioning reference signal resources configured by the base station to the positioning server according to the instruction.

In some embodiments, the downlink positioning reference signal resource information includes an index of a downlink positioning reference signal resource, or the downlink positioning reference signal resource information includes an index of a downlink positioning reference signal resource set.

In some embodiments, the downlink positioning reference signal angle information includes: a horizontal dimension angle and/or a vertical dimension angle of a downlink positioning reference signal.

It should be noted here that the above-mentioned base station provided in this embodiment of the present application can implement all the method steps implemented in the above-mentioned method embodiments. The parts and beneficial effects in this embodiment same as those in the method embodiments will not be described here in detail.

An embodiment of the present application further provides a positioning server.

Figure 13:
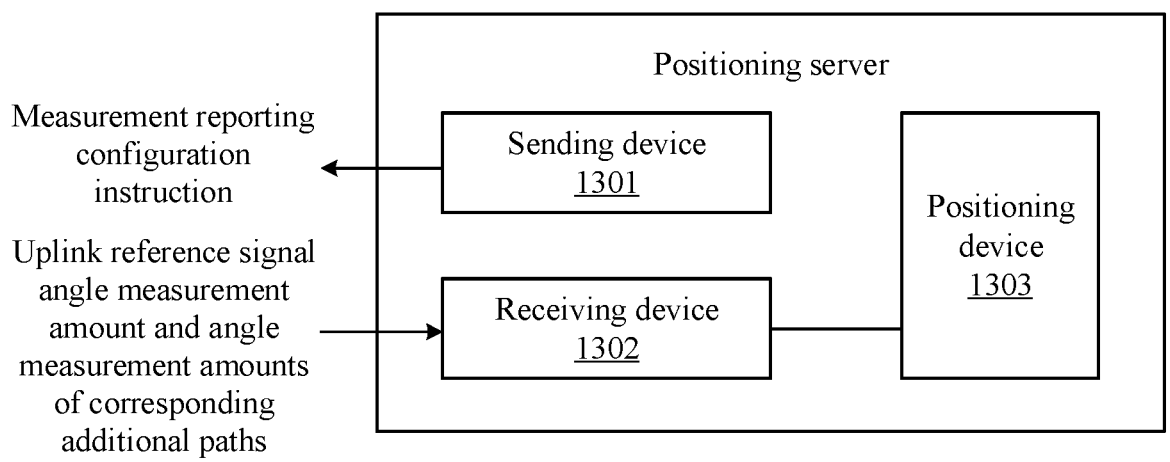
FIG. 13 is a structural schematic diagram of another positioning server according to an embodiment of the present application.

Referring to FIG. 13, which is a structural schematic diagram of a positioning server according to an embodiment of the present application, the positioning server can implement the functions implemented by the positioning server in FIG. 4 and FIG. 5. As shown in the figure, the positioning server may include: a sending device 1301, a receiving device 1302, and a positioning device 1303, and the sending device 1301 is configured to send a measurement reporting configuration instruction to a base station, and the measurement reporting configuration instruction is used to instruct the base station to report an uplink reference signal angle measurement obtained by measuring an uplink reference signal sent by a terminal and corresponding additional path angle information;

the receiving device 1302 is configured to receive the uplink reference signal angle measurement and a corresponding additional path angle measurement reported by the base station;

the positioning device 1303 is configured to position the terminal according to the uplink reference signal angle measurement and the corresponding additional path angle information reported by the base station.

In some embodiments, the additional path angle information includes: a horizontal dimension angle and/or a vertical dimension angle of each of additional paths of an uplink reference signal corresponding to the uplink reference signal angle measurement.

It should be noted here that the above-mentioned positioning server provided in this embodiment of the present application can implement all the method steps implemented in the above-mentioned method embodiments. The parts and beneficial effects in this embodiment same as those in the method embodiments will not be described here in detail.

An embodiment of the present application further provides a base station.

Figure 14:
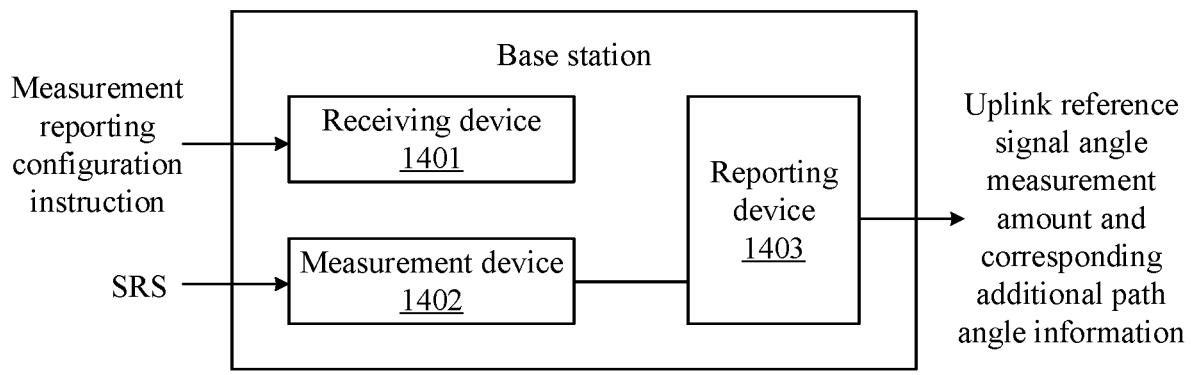
FIG. 14 is a structural schematic diagram of another base station according to an embodiment of the present application.

Referring to FIG. 14, which is a structural schematic diagram of a base station according to an embodiment of the present application, the base station can implement the functions implemented by the base station in FIG. 4 and FIG. 5. As shown in the figure, the base station may include: a receiving device 1401, a measurement device 1402, and a reporting device 1403, and the receiving device 1401 is configured to receive a measurement reporting configuration instruction sent by a positioning server;

the measurement device 1402 is configured to measure an uplink reference signal sent by a terminal to obtain an uplink reference signal angle measurement and corresponding additional path angle information;

the reporting device 1403 is configured to report the uplink reference signal measurement and the corresponding additional path angle information to the positioning server according to the measurement reporting configuration instruction, and the positioning server positions the terminal according to the uplink reference signal measurement and the corresponding additional path angle information reported by the base station.

In some embodiments, the additional path angle information includes: a horizontal dimension angle and/or a vertical dimension angle of each of additional paths of an uplink reference signal corresponding to the uplink reference signal angle measurement.

It should be noted here that the above-mentioned base station provided in this embodiment of the present application can implement all the method steps implemented in the above-mentioned method embodiments. The parts and beneficial effects in this embodiment same as those in the method embodiments will not be described here in detail.

An embodiment of the present application further provides a positioning server.

Figure 15:
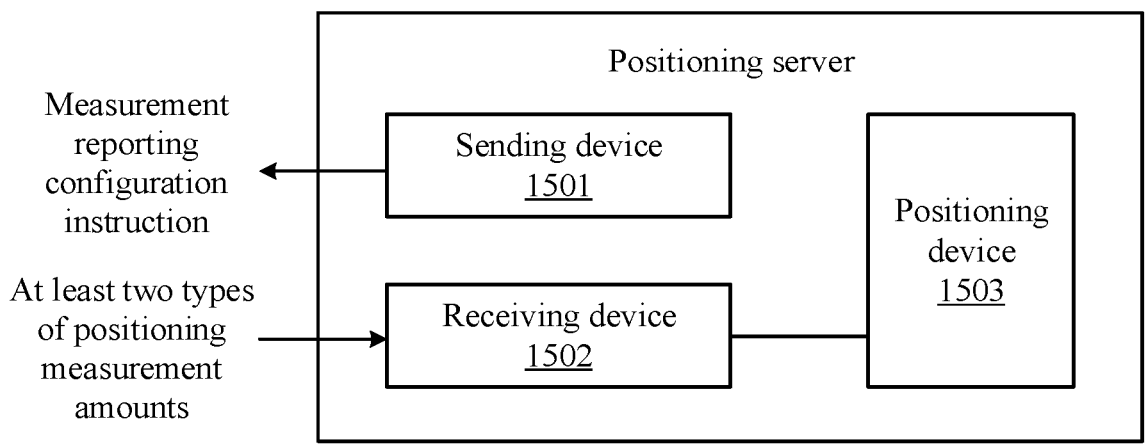
FIG. 15 is a structural schematic diagram of another positioning server according to an embodiment of the present application.

Referring to FIG. 15, which is a structural schematic diagram of a positioning server according to an embodiment of the present application, the positioning server can implement the functions implemented by the positioning server in FIG. 6, FIG. 7 and FIG. 8. As shown in the figure, the positioning server may include: a sending device 1501, a receiving device 1502, and a positioning device 1503, and the sending device 1501 is configured to send a measurement reporting configuration instruction to a terminal, and the measurement reporting configuration instruction is used to instruct the terminal to report at least two types of positioning measurements, which include at least two of a time measurement, an angle measurement and a power measurement;

the receiving device 1502 is configured to receive at least two types of positioning measurements reported by the terminal, and among the at least two types of positioning measurements, one type of positioning measurement is associated with at least one positioning measurement in another type of positioning measurements, or one type of positioning measurement is associated with at least two other types of positioning measurements;

the positioning device 1503 is configured to position the terminal according to the at least two types of positioning measurements reported by the terminal.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the terminal.

In some embodiments, the at least two types of positioning measurements include at least a time measurement and an angle measurement, or at least a downlink angle measurement and a power measurement.

It should be noted here that the above-mentioned positioning server provided in this embodiment of the present application can implement all the method steps implemented in the above-mentioned method embodiments. The parts and beneficial effects in this embodiment same as those in the method embodiments will not be described here in detail.

An embodiment of the present application further provides a terminal.

Figure 16:
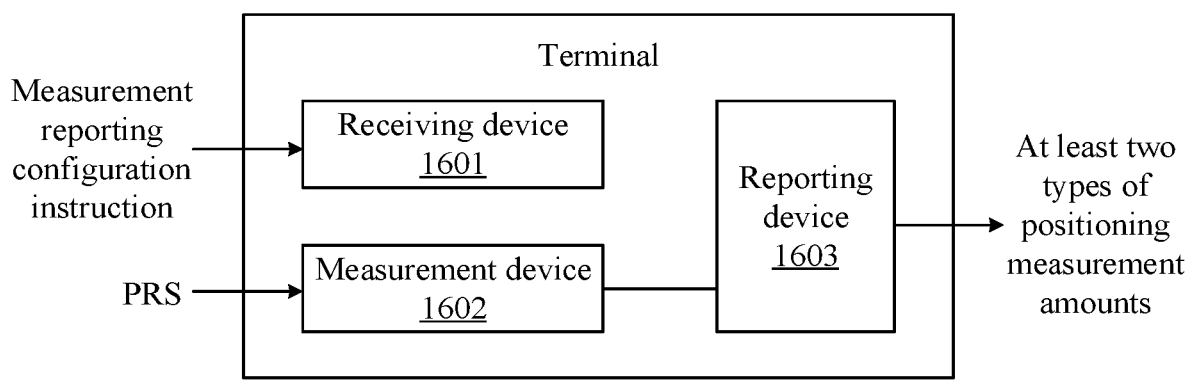
FIG. 16 is a structural schematic diagram of another terminal according to an embodiment of the present application.

Referring to FIG. 16, which is a structural schematic diagram of a terminal according to an embodiment of the present application, the terminal can implement the functions implemented by the terminal in FIG. 6, FIG. 7 and FIG. 8. As shown in the figure, the terminal may include: a receiving device 1601, a measurement device 1602, and a reporting device 1603, and the receiving device 1601 is configured to receive a measurement reporting configuration instruction sent by a positioning server, and the measurement reporting configuration instruction is used to instruct the terminal to report at least two types of positioning measurements, which include at least two of a time measurement, an angle measurement and a power measurement;

the measurement device 1602 is configured to determine at least two types of positioning measurements reported, and among the at least two types of positioning measurements, one type of positioning measurement is associated with at least one positioning measurement of another type, or one type of positioning measurement is associated with at least two other types of positioning measurements;

the reporting device 1603 is configured to report at least two types of positioning measurements to the positioning server.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the terminal.

In some embodiments, the at least two types of positioning measurements include at least a time measurement and an angle measurement, or at least a downlink angle measurement and a power measurement.

It should be noted here that the above-mentioned terminal provided in this embodiment of the present application can implement all the method steps implemented in the above-mentioned method embodiments. The parts and beneficial effects in this embodiment same as those in the method embodiments will not be described here in detail.

An embodiment of the present application further provides a positioning server.

Figure 17:
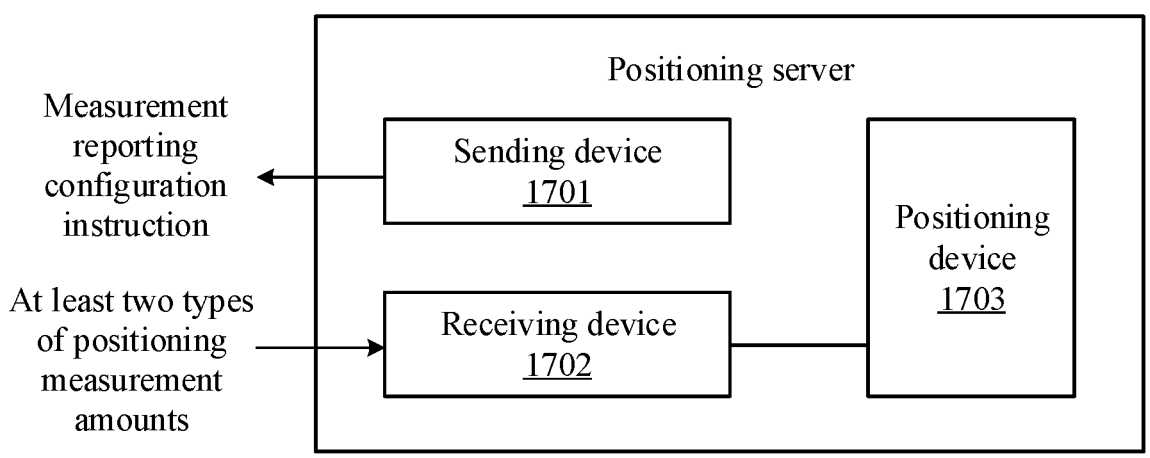
FIG. 17 is a structural schematic diagram of another positioning server according to an embodiment of the present application.

Referring to FIG. 17, which is a structural schematic diagram of a positioning server according to an embodiment of the present application, the positioning server can implement the functions implemented by the positioning server in FIG. 9 and FIG. 10. As shown in the figure, the positioning server may include: a sending device 1701, a receiving device 1702, and a positioning device 1703, and the sending device 1701 is configured to send a measurement reporting configuration instruction to a base station, and the measurement reporting configuration instruction is used to instruct the base station to report at least two types of positioning measurements, which include at least two of a time measurement, an angle measurement and a power measurement;

the receiving device 1702 is configured to receive at least two types of positioning measurements reported by the base station and obtained by measuring an uplink signal sent by a terminal, and among the at least two types of positioning measurements, one type of positioning measurement is associated with at least one positioning measurement of another type, or one type of positioning measurement is associated with at least two other types of positioning measurements;

the positioning device 1703 is configured to position the terminal according to the at least two types of positioning measurements reported by the base station.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the base station.

In some embodiments, the at least two types of positioning measurements include at least a time measurement and an angle measurement, or at least a downlink angle measurement and a power measurement.

It should be noted here that the above-mentioned positioning server provided in this embodiment of the present application can implement all the method steps implemented in the above-mentioned method embodiments. The parts and beneficial effects in this embodiment same as those in the method embodiments will not be described here in detail.

An embodiment of the present application further provides a base station.

Figure 18:
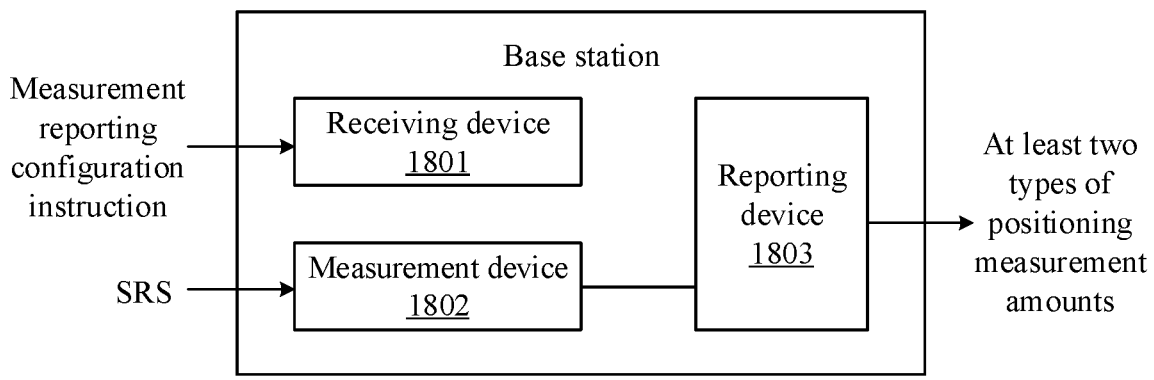
FIG. 18 is a structural schematic diagram of another base station according to an embodiment of the present application.

Referring to FIG. 18, which is a structural schematic diagram of a base station according to an embodiment of the present application, the base station can implement the functions implemented by the base station in FIG. 9 and FIG. 10. As shown in the figure, the base station may include: a receiving device 1801, a measurement device 1802, and a reporting device 1803, and the receiving device 1801 is configured to receive a measurement reporting configuration instruction sent by a positioning server, and the measurement reporting configuration instruction is used to instruct the base station to report at least two types of positioning measurements, which include at least two of a time measurement, an angle measurement and a power measurement;

the measurement device 1802 is configured to determine at least two types of positioning measurements reported and obtained by measuring an uplink signal sent by a terminal, and among the at least two types of positioning measurements, one type of positioning measurement is associated with at least one positioning measurement of another type, or one type of positioning measurement is associated with at least two other types of positioning measurements;

the reporting device 1803 is configured to report at least two types of positioning measurements to the positioning server.

In some embodiments, the at least two types of positioning measurements further include: measurements of additional paths corresponding to the time measurement, angle measurement or power measurement, and a measurement of each of the additional paths is associated with a measurement of at least one additional path of another type or associated with measurements of additional paths of at least two other types.

In some embodiments, the numbers of measurements of different paths among the additional paths are same or different.

In some embodiments, a reporting manner of the measurements of the additional paths is configured by the positioning server, or predefined by a system, or determined by the base station.

In some embodiments, the at least two types of positioning measurements include at least a time measurement and an angle measurement, or at least a downlink angle measurement and a power measurement.

It should be noted here that the above-mentioned base station provided in this embodiment of the present application can implement all the method steps implemented in the above-mentioned method embodiments. The parts and beneficial effects in this embodiment same as those in the method embodiments will not be described here in detail.

An embodiment of the present application further provides a positioning server. The positioning server may implement the functions on the positioning server side in the foregoing embodiments.

Figure 19:
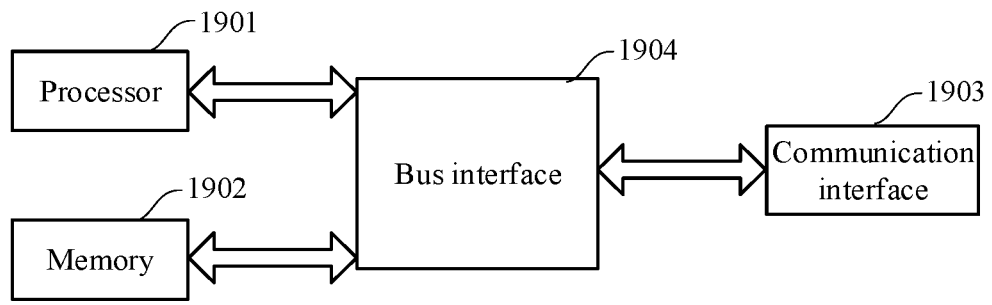
FIG. 19 is a structural schematic diagram of a positioning server according to an embodiment of the present application.

Referring to FIG. 19, it is a structural schematic diagram of a positioning server according to an embodiment of the present application. As shown in the figure, the positioning server may include: a processor 1901, a memory 1902, a communication interface 1903 and a bus interface 1904.

The processor 1901 is responsible for managing the bus architecture and general processing, and the memory 1902 may store the data used by the processor 1901 when performing the operations. The communication interface 1903 is configured to receive and send data under the control of the processor 1901.

The bus architecture may include any numbers of interconnected buses and bridges, and specifically link various circuits of one or more processors represented by the processor 1901 and the memory represented by the memory 1902. The bus architecture may further link various other circuits such as peripheral device, voltage regulator and power management circuit, which are all well known in the art and thus will not be further described again herein. The bus interface provides an interface. The processor 1901 is responsible for managing the bus architecture and general processing, and the memory 1902 may store the data used by the processor 1901 when performing the operations.

The procedure disclosed by embodiments of the present application may be applied in the processor 1901 or implemented by the processor 1901. In the implementation process, each step of the signal processing flow may be completed by the integrated logic circuit of hardware in the processor 1901 or the instruction in the form of software. The processor 1901 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1902, and the processor 1901 reads the information in the memory 1902 and completes the steps of the signal processing flow in combination with its hardware.

In some embodiments, the processor 1901 is configured to read the computer instructions in the memory 1902 and execute the functions implemented by the positioning server in the embodiments of the present application.

It should be noted here that the above-mentioned positioning server provided in this embodiment of the disclosure can implement all the method steps implemented by the positioning server in the above-mentioned method embodiments. The parts and beneficial effects in this embodiment same as those in the method embodiments will not be described here in detail.

An embodiment of the present application further provides a base station. The base station can implement the functions of the base station side in the foregoing embodiments.

Figure 20:
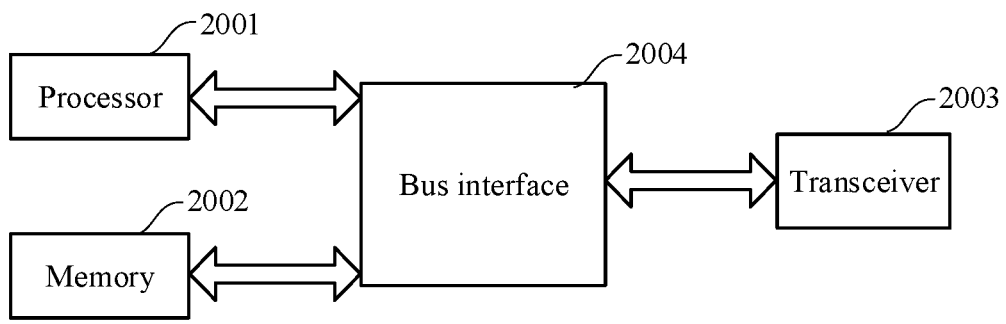
FIG. 20 is a structural schematic diagram of a base station according to an embodiment of the present application.

Referring to FIG. 20, it is a structural schematic diagram of a base station according to an embodiment of the present application. As shown in the figure, the base station may include: a processor 2001, a memory 2002, a transceiver 2003 and a bus interface 2004.

The processor 2001 is responsible for managing the bus architecture and general processing, and the memory 2002 may store the data used by the processor 2001 when performing the operations. The transceiver 2003 is configured to receive and send data under the control of the processor 2001.

The bus architecture may include any numbers of interconnected buses and bridges, and specifically link various circuits of one or more processors represented by the processor 2001 and the memory represented by the memory 2002. The bus architecture may further link various other circuits such as peripheral device, voltage regulator and power management circuit, which are all well known in the art and thus will not be further described again herein. The bus interface provides an interface. The processor 2001 is responsible for managing the bus architecture and general processing, and the memory 2002 may store the data used by the processor 2001 when performing the operations.

The procedure disclosed by embodiments of the present application may be applied in the processor 2001 or implemented by the processor 2001. In the implementation process, each step of the signal processing flow may be completed by the integrated logic circuit of hardware in the processor 2001 or the instruction in the form of software. The processor 2001 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 2002, and the processor 2001 reads the information in the memory 2002 and completes the steps of the signal processing flow in combination with its hardware.

In some embodiments, the processor 2001 is configured to read the computer instructions in the memory 2002 and execute the functions implemented by the base station in the embodiments of the present application.

It should be noted here that the above-mentioned base station provided in this embodiment of the disclosure can implement all the method steps implemented by the base station in the above-mentioned method embodiments. The parts and beneficial effects in this embodiment same as those in the method embodiments will not be described here in detail.

An embodiment of the present application further provides a terminal. The terminal can implement the functions on the terminal side in the foregoing embodiments.

Figure 21:
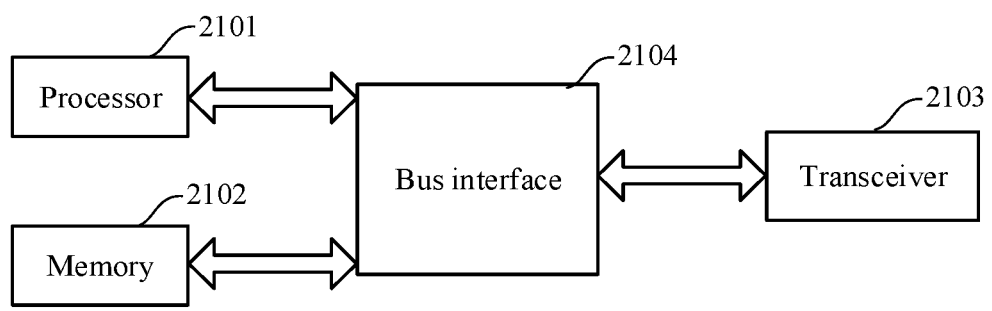
FIG. 21 is a structural schematic diagram of a terminal according to an embodiment of the present application.

Referring to FIG. 21, it is a structural schematic diagram of a terminal according to an embodiment of the present application. As shown in the figure, the terminal may include: a processor 2101, a memory 2102, a transceiver 2103 and a bus interface 2104.

The processor 2101 is responsible for managing the bus architecture and general processing, and the memory 2102 may store the data used by the processor 2101 when performing the operations. The transceiver 2103 is configured to receive and send data under the control of the processor 2101.

The bus architecture may include any numbers of interconnected buses and bridges, and specifically link various circuits of one or more processors represented by the processor 2101 and the memory represented by the memory 2102. The bus architecture may further link various other circuits such as peripheral device, voltage regulator and power management circuit, which are all well known in the art and thus will not be further described again herein. The bus interface provides an interface. The processor 2101 is responsible for managing the bus architecture and general processing, and the memory 2102 may store the data used by the processor 2101 when performing the operations.

The procedure disclosed by the embodiment of the present application may be applied in the processor 2101 or implemented by the processor 2101. In the implementation process, each step of the signal processing flow may be completed by the integrated logic circuit of hardware in the processor 2101 or the instruction in the form of software. The processor 2101 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 2102, and the processor 2101 reads the information in the memory 2102 and completes the steps of the signal processing flow in combination with its hardware.

In some embodiments, the processor 2101 is configured to read the computer instructions in the memory 2102 and execute the functions implemented by the terminal in the embodiments of the present application.

It should be noted here that the above-mentioned terminal provided in this embodiment of the disclosure can implement all the method steps implemented by the terminal in the above-mentioned method embodiments. The parts and beneficial effects in this embodiment same as those in the method embodiments will not be described here in detail.

An embodiment of the present application further provides a computer readable storage medium storing computer executable instructions which are configured to cause a computer to execute the method performed by the positioning server in the above-mentioned embodiments.

An embodiment of the present application further provides a computer readable storage medium storing computer executable instructions which are configured to cause a computer to execute the method performed by the base station in the above-mentioned embodiments.

An embodiment of the present application further provides a computer readable storage medium storing computer executable instructions which are configured to cause a computer to execute the method performed by the terminal in the above-mentioned embodiments.

It The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which may guide the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A terminal positioning method, applied to a positioning server, wherein the method comprises:
   receiving a positioning measurement information reported by a terminal, wherein the positioning measurement information comprises a downlink positioning reference signal resource information and a downlink positioning reference signal measurement corresponding to the downlink positioning reference signal resource information;
   obtaining a downlink positioning reference signal angle information corresponding to the downlink positioning reference signal resource information reported by a base station;
   positioning the terminal according to the positioning measurement information reported by the terminal and the downlink positioning reference signal angle information reported by the base station;
   wherein the obtaining the downlink positioning reference signal angle information corresponding to the downlink positioning reference signal resource information reported by the base station, comprises:
   sending an instruction to the base station corresponding to the downlink positioning reference signal resource information according to the downlink positioning reference signal resource information in the positioning measurement information reported by the terminal, wherein the instruction carries the downlink positioning reference signal resource information;
   receiving the downlink positioning reference signal angle information corresponding to the downlink positioning reference signal resource information carried in the instruction reported by the base station.

2. The method according to claim 1, further comprises:
   instructing the base station to determine a downlink positioning reference signal angle information corresponding to all configured downlink positioning reference signal resources;
   receiving the downlink positioning reference signal angle information corresponding to all the downlink positioning reference signal resources reported by the base station.

3. The method according to claim 1, wherein the downlink positioning reference signal resource information comprises an index of a downlink positioning reference signal resource, or the downlink positioning reference signal resource information comprises an index of a downlink positioning reference signal resource set;
   or
   the downlink positioning reference signal angle information comprises: a horizontal dimension angle of a downlink positioning reference signal and/or a vertical dimension angle of a downlink positioning reference signal.

4. A positioning server, comprises: a processor, a memory and a communication interface;
   the communication interface receives and sends data under control of the processor;
   the memory stores computer instructions;
   the processor is configured to read the computer instructions to perform the method according to claim 1.

5. A terminal positioning method, applied to a base station, wherein the method comprises:
   configuring a downlink positioning reference signal resource and determining a downlink positioning reference signal angle information corresponding to the downlink positioning reference signal resource, and sending a downlink positioning reference signal according to the downlink positioning reference signal resource and the downlink positioning reference signal angle information;
   reporting the downlink positioning reference signal angle information corresponding to the downlink positioning reference signal resource to a positioning server according to an indication of the positioning server, so that the positioning server positions a terminal according to a positioning measurement information reported by the terminal and the downlink positioning reference signal angle information reported by the base station, wherein the positioning measurement information comprises a downlink positioning reference signal resource information and a downlink positioning reference signal measurement corresponding to the downlink positioning reference signal resource information;
   wherein the reporting the downlink positioning reference signal angle information corresponding to the downlink positioning reference signal resource to the positioning server according to the indication of the positioning server, comprises:
   receiving an instruction sent by the positioning server, wherein the instruction carries the downlink positioning reference signal resource information in the positioning measurement information reported by the terminal;
   sending the downlink positioning reference signal angle information corresponding to the downlink positioning reference signal resource information carried in the instruction to the positioning server.

6. The method according to claim 5, wherein the reporting the downlink positioning reference signal angle information corresponding to the downlink positioning reference signal resource to the positioning server according to the indication of the positioning server, comprises:

receiving an instruction sent by the positioning server;

reporting a downlink positioning reference signal angle information corresponding to all downlink positioning reference signal resources configured by the base station to the positioning server according to the instruction.

7. The method according to claim 5, wherein the downlink positioning reference signal resource information comprises an index of a downlink positioning reference signal resource, or the downlink positioning reference signal resource information comprises an index of a downlink positioning reference signal resource set;

or the downlink positioning reference signal angle information comprises: a horizontal dimension angle of a downlink positioning reference signal and/or a vertical dimension angle of a downlink positioning reference signal.

8. A base station, comprises: a processor, a memory and a transceiver;

the transceiver receives and sends data under control of the processor;

the memory stores computer instructions;

the processor is configured to read the computer instructions to perform the method according to claim 5.

9. A terminal positioning method, applied to a positioning server, wherein the method comprises:

sending a measurement reporting configuration instruction to a base station, wherein the measurement reporting configuration instruction is used to instruct the base station to report an uplink reference signal angle measurement obtained by measuring an uplink reference signal sent by a terminal and an additional path angle information corresponding to the uplink reference signal angle measurement;

receiving the uplink reference signal angle measurement and the additional path angle information reported by the base station;

positioning the terminal according to the uplink reference signal angle measurement and the additional path angle information reported by the base station.

10. The method according to claim 9, wherein the additional path angle information comprises: a horizontal dimension angle of each of additional paths of an uplink reference signal corresponding to the uplink reference signal angle measurement and/or a vertical dimension angle of each of additional paths of an uplink reference signal corresponding to the uplink reference signal angle measurement.

11. A positioning server, comprises: a processor, a memory and a communication interface;

the communication interface receives and sends data under control of the processor;

the memory stores computer instructions;

the processor is configured to read the computer instructions to perform the method according to claim 9.

12. A terminal positioning method, applied to a base station, wherein the method comprises:

receiving an measurement reporting configuration instruction sent by a positioning server;

measuring an uplink reference signal sent by a terminal to obtain an uplink reference signal angle measurement and an additional path angle information corresponding to the uplink reference signal angle measurement;

reporting the uplink reference signal measurement and the additional path angle information to the positioning server according to the measurement reporting configuration instruction, so that the positioning server positions the terminal according to the uplink reference signal measurement and the additional path angle information reported by the base station.

13. The method according to claim 12, wherein the additional path angle information comprises: a horizontal dimension angle of each of additional paths of an uplink reference signal corresponding to the uplink reference signal angle measurement and/or a vertical dimension angle of each of additional paths of an uplink reference signal corresponding to the uplink reference signal angle measurement.

14. A base station, comprises: a processor, a memory and a transceiver;

the transceiver receives and sends data under control of the processor;

the memory stores computer instructions;

the processor is configured to read the computer instructions to perform the method according to claim 12.

* * * * *